United States Patent
Rahman et al.

(10) Patent No.: US 11,678,339 B2
(45) Date of Patent: Jun. 13, 2023

(54) METHOD AND APPARATUS FOR GROUP-BASED MULTI-BEAM OPERATION

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 96 days.

(21) Appl. No.: 17/118,499

(22) Filed: Dec. 10, 2020

(65) Prior Publication Data

US 2021/0185647 A1 Jun. 17, 2021

Related U.S. Application Data

(60) Provisional application No. 62/947,873, filed on Dec. 13, 2019.

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0048* (2013.01); *H04L 41/0803* (2013.01); *H04W 72/046* (2013.01); *H04W 72/0453* (2013.01)

(58) Field of Classification Search
CPC ..... H04B 7/0695; H04B 7/088; H04L 5/0048; H04L 5/0053; H04L 5/0091;
(Continued)

(56) References Cited

U.S. PATENT DOCUMENTS 10,856,316 B2 * 12/2020 Liou ................. H04W 72/1205
10,887,884 B2 * 1/2021 Onggosanusi ........ H04L 5/0048
(Continued)

FOREIGN PATENT DOCUMENTS

CN 111245488 A * 6/2020 ........... H04B 17/373
CN 113574943 A * 10/2021 ........... H04L 5/0051
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.3.0, Sep. 2020, 249 pages.
(Continued)

*Primary Examiner* — Eric Nowlin

(57) ABSTRACT

A method for operating a user equipment (UE) comprises receiving configuration information on a set of transmission configuration indicator (TCI) states; receiving a beam indication indicating at least one TCI state from the set of TCI states, wherein the at least one TCI state indicates a group of M beams partitioned into K sets of beams for K entities ($E_1$, $E_2$, ... $E_K$), where an i-th set of beams is associated with entity $E_i$ and comprises $N_i$ beams, and $\Sigma_{i=1}^{K} N_i = M$; decoding the beam indication; determining a beam for entity $E_i$ based on the i-th set of beams; and transmitting an uplink (UL) transmission or receiving a downlink (DL) transmission based on the determined beam for entity $E_i$, wherein i is an entity index and takes a value from $\{1, \ldots, K\}$.

11 Claims, 16 Drawing Sheets

(51) Int. Cl.
*H04L 41/0803* (2022.01)
*H04W 72/0453* (2023.01)
*H04W 72/044* (2023.01)

(58) Field of Classification Search
CPC .............. H04L 41/0803; H04L 41/0806; H04L 41/0893; H04W 72/042; H04W 72/0453; H04W 72/046
See application file for complete search history.

(56) References Cited

U.S. PATENT DOCUMENTS

| | | | | |
|---|---|---|---|---|
| 10,972,244 | B2* | 4/2021 | Guo | H04B 7/0695 |
| 11,184,888 | B2* | 11/2021 | Khoshnevisan | H04L 1/0046 |
| 2019/0103908 | A1* | 4/2019 | Yu | H04B 7/0695 |
| 2019/0373450 | A1* | 12/2019 | Zhou | H04W 72/048 |
| 2020/0100225 | A1* | 3/2020 | Khoshnevisan | H04W 72/042 |
| 2020/0100232 | A1* | 3/2020 | Onggosanusi | H04W 72/14 |
| 2020/0112411 | A1* | 4/2020 | Khoshnevisan | H04W 72/042 |
| 2020/0153581 | A1* | 5/2020 | Tsai | H04L 27/2649 |
| 2020/0280409 | A1* | 9/2020 | Grant | H04W 72/042 |
| 2020/0314857 | A1* | 10/2020 | Pezeshki | H04W 76/27 |
| 2020/0383096 | A1* | 12/2020 | Yang | H04L 5/0053 |
| 2021/0037558 | A1* | 2/2021 | Xu | H04W 72/042 |
| 2021/0058998 | A1* | 2/2021 | Yuan | H04W 24/08 |
| 2021/0160880 | A1* | 5/2021 | Zhang | H04L 5/0064 |
| 2021/0306867 | A1* | 9/2021 | Hamidi-Sepehr | H04W 72/046 |
| 2021/0329517 | A1* | 10/2021 | Noh | H04B 7/0639 |
| 2021/0337548 | A1* | 10/2021 | Gao | H04L 5/0051 |
| 2021/0391899 | A1* | 12/2021 | Cao | H04B 17/373 |
| 2021/0391912 | A1* | 12/2021 | Hakola | H04B 7/0408 |
| 2022/0007387 | A1* | 1/2022 | Wang | H04W 72/1289 |
| 2022/0039073 | A1* | 2/2022 | Lee | H04W 72/042 |
| 2022/0039124 | A1* | 2/2022 | Frenne | H04B 7/0628 |
| 2022/0078766 | A1* | 3/2022 | Li | H04B 7/0695 |
| 2022/0104031 | A1* | 3/2022 | Matsumura | H04W 72/23 |
| 2022/0116247 | A1* | 4/2022 | Sengupta | H04L 5/0094 |
| 2022/0131668 | A1* | 4/2022 | Matsumura | H04B 7/0695 |
| 2022/0150929 | A1* | 5/2022 | Matsumura | H04L 5/0035 |
| 2022/0225120 | A1* | 7/2022 | Matsumura | H04L 5/0051 |
| 2022/0239432 | A1* | 7/2022 | Fujimura | H04L 5/0048 |
| 2022/0239437 | A1* | 7/2022 | Matsumura | H04L 5/006 |
| 2022/0256522 | A1* | 8/2022 | Matsumura | H04W 72/0406 |
| 2022/0278787 | A1* | 9/2022 | Liu | H04L 5/0023 |

FOREIGN PATENT DOCUMENTS

| | | | | |
|---|---|---|---|---|
| CN | 113748615 | A * | 12/2021 | H04L 5/0023 |
| CN | 114097181 | A * | 2/2022 | H04L 5/0051 |
| EP | 3852298 | A1 * | 7/2021 | H04B 7/0408 |
| EP | 3890203 | A1 * | 10/2021 | H04B 17/373 |
| EP | 3914002 | A1 * | 11/2021 | H04L 5/0051 |
| EP | 3926850 | A1 * | 12/2021 | H04L 5/0023 |
| EP | 3968534 | A1 * | 3/2022 | H04L 5/0051 |
| JP | WO2020166081 | A1 * | 12/2021 | |
| KR | 20210095626 | A * | 8/2021 | |
| WO | 2019049096 | A1 | 3/2019 | |
| WO | WO-2020064908 | A1 * | 4/2020 | |
| WO | WO-2020108473 | A1 * | 6/2020 | H04B 17/373 |
| WO | WO-2020148903 | A1 * | 7/2020 | H04L 5/0051 |
| WO | WO-2020166081 | A1 * | 8/2020 | H04L 5/0023 |
| WO | WO-2020230217 | A1 * | 11/2020 | H04L 5/0051 |
| WO | WO-2021062634 | A1 * | 4/2021 | |
| WO | WO-2022083778 | A1 * | 4/2022 | |

OTHER PUBLICATIONS

"3rd Generation Partnership Project;Technical Specification Group Radio Access Network; Evolved Universal Terrestrial Radio Access (E-UTRA); Multiplexing and channel coding (Release 16)", 3GPP TS 36.212 V16.3.0, Sep. 2020, 253 pages.
"3rd Generation Partnership Project; Technical Specification Group Radio Access Network; Evolved Universal Terrestrial Radio Access (E-UTRA); Physical layer procedures (Release 16)", 3GPP TS 36.213 V16.3.0, Sep. 2020, 577 pages.
"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.2.0, Sep. 2020, 141 pages.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.2.1, Sep. 2020, 1,081 pages.
"3rd Generation Partnership Project; Technical Specification Group Services and System Aspects; Feasibility Study on New Services and Markets Technology Enablers; Stage 1 (Release 14)", 3GPP TR 22.891 V14.2.0, Sep. 2016, 97 pages.
"3rd Generation Partnership Project; Technical Specification Group Radio Access Network; NR; Multiplexing and channel coding (Release 16)", 3GPP TS 38.212 V16.3.0, Sep. 2020, 497 pages.
"3rd Generation Partnership Project; Technical Specification Group Radio Access Network; NR; Physical layer procedures for control (Release 16)", 3GPP TS 38.213 V16.3.0, Sep. 2020, 179 pages.
"3rd Generation Partnership Project; Technical Specification Group Radio Access Network; NR; Physical layer procedures for data (Release 16)", 3GPP TS 38.214 V16.3.0, Sep. 2020, 166 pages.
International Search Report of the International Searching Authority dated Mar. 15, 2021 in connection with International Application No. PCT/KR2020/018277, 3 pages.
Oppo, "Discussion on Multi-beam Operation Enhancements," R1-1911844, 3GPP TSG RAN WG1 Meeting #99, Reno, US, Nov. 18-22, 2019, 13 pages.
Samsung, "Reduction of signaling and latency for beam management," R2-1915248, 3GPP TSG-RAN WG2 Meeting #108, Reno, US, Nov. 18-22, 2019, 8 pages.
Vivo, "Remaining issues on multi-beam transmission," R1-1912040, 3GPP TSG RAN WG1 Meeting #99, Reno, US, Nov. 18-22, 2019, 10 pages.
Zte, "Enhancements on Multi-TRP and Multi-panel Transmission," R1-1911930, 3GPP TSG RAN WG1 Meeting #99, Reno, US, Nov. 18-22, 2019, 14 pages.
Extended European Search Report dated Dec. 2, 2022 regarding Application No. 20900664.2, 10 pages.
Huawei et al., "Further details on beam indication", 3GPP TSG RAN WG1 Meeting #91, R1-1719806, Nov. 2017, 12 pages.
LG Electronics, "Feature lead summary of Enhancements on Multi-beam Operations", 3GPP TSG RAN WG1 Meeting #98, R1-1909695, Aug. 2019, 36 pages.

\* cited by examiner

METHOD AND APPARATUS FOR GROUP-BASED MULTI-BEAM OPERATION

CROSS-REFERENCE TO RELATED APPLICATIONS AND CLAIM OF PRIORITY

The present application claims priority to U.S. Provisional Patent Application No. 62/947,873 filed on Dec. 13, 2019. The content of the above-identified patent document is incorporated herein by reference.

TECHNICAL FIELD

The present disclosure relates generally to wireless communication systems and more specifically for group-based multi-beam operation.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment (UE) can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two-dimensional array transmit antennas or, in general, antenna array geometry which accommodates a large number of antenna elements.

SUMMARY

Embodiments of the present disclosure provide methods and apparatuses to enable downlink and uplink multi-beam operation in a wireless communication system.

In one embodiment, a UE is provided. The UE comprises a transceiver configured to receive configuration information on a set of transmission configuration indicator (TCI) states, and receive a beam indication indicating at least one TCI state from the set of TCI states, where the at least one TCI state indicates a group of M beams partitioned into K sets of beams for K entities ($E_1, E_2, \ldots E_K$), where an i-th set of beams is associated with entity $E_i$. The UE further includes a processor coupled to the transceiver. The processor is configured to decode the beam indication, and determine a beam for entity $E_i$ based on the i-th set of beams, where the transceiver is further configured to transmit an uplink (UL) transmission or receive a downlink (DL) transmission based on the determined beam for entity $E_i$, where i is an entity index and takes a value from $\{1, \ldots, K\}$.

In another embodiment, a BS in a wireless communication system is provided. The BS includes a processor configured to generate configuration information on a set of transmission configuration indicator (TCI) states, and generate a beam indication indicating at least one TCI state from the set of TCI states, where the at least one TCI state indicates a group of M beams partitioned into K sets of beams for K entities ($E_1, E_2, \ldots E_K$), where an i-th set of beams is associated with entity $E_i$. The BS further includes a transceiver coupled to the processor. The transceiver is configured to transmit the configuration information; transmit the beam indication; and receive an uplink (UL) transmission or transmit a downlink (DL) transmission based on a beam for entity $E_i$ from the i-th set of beams, where i is an entity index and takes a value from $\{1, \ldots, K\}$.

In yet another embodiment, a method for operating a UE is provided. The method comprises receiving configuration information on a set of transmission configuration indicator (TCI) states; receiving a beam indication indicating at least one TCI state from the set of TCI states, where the at least one TCI state indicates a group of M beams partitioned into K sets of beams for K entities ($E_1, E_2, \ldots E_K$), where an i-th set of beams is associated with entity $E_i$; decoding the beam indication; determining a beam for entity $E_i$ based on the i-th set of beams; and transmitting an uplink (UL) transmission or receiving a downlink (DL) transmission based on the determined beam for entity $E_i$, where i is an entity index and takes a value from $\{1, \ldots, K\}$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
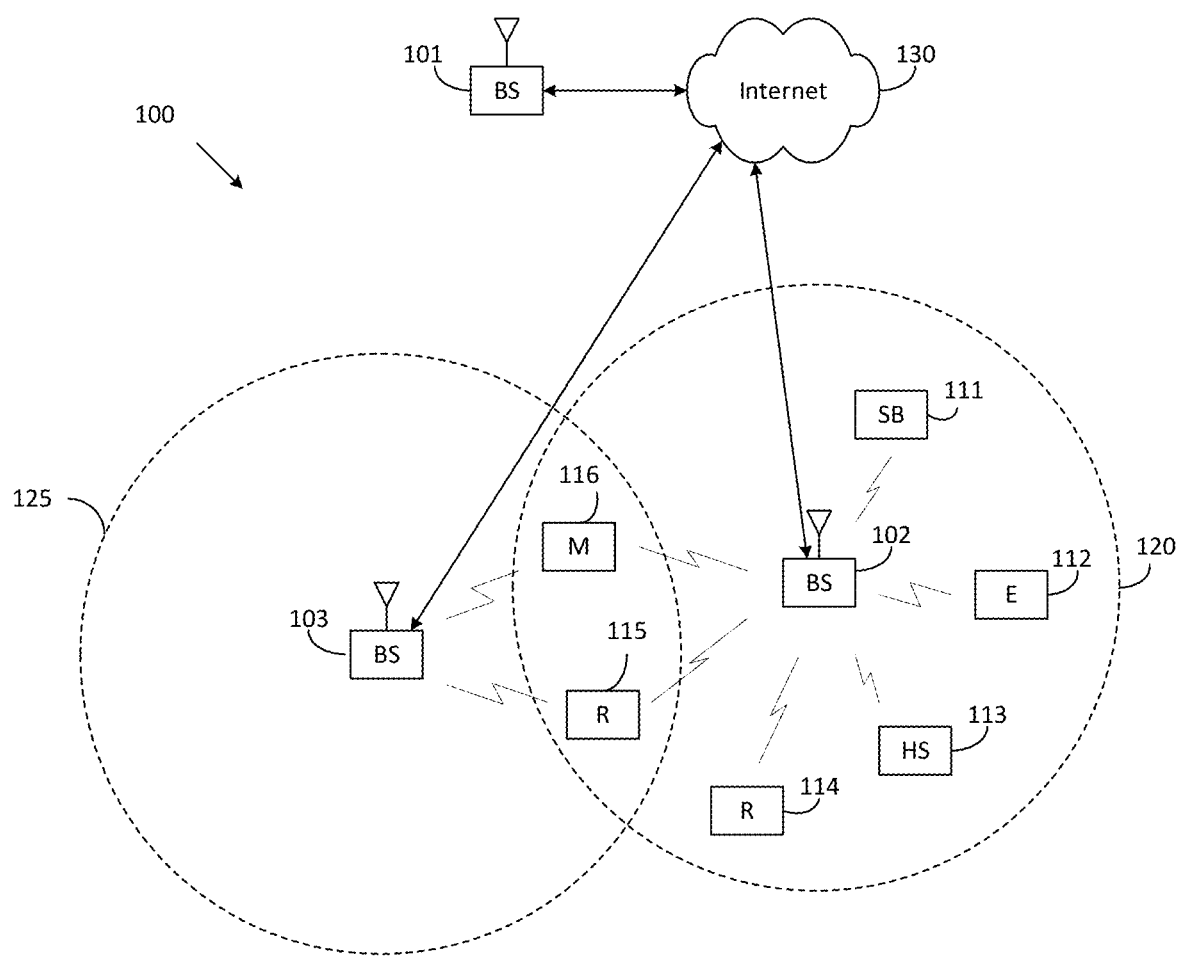
FIG. 1 illustrates an example wireless network according to embodiments of the present disclosure.

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v16.3.0, "E-UTRA, Physical channels and modulation" (herein "REF 1"); 3GPP TS 36.212 v16.3.0, "E-UTRA, Multiplexing and Channel coding" (herein "REF 2"); 3GPP TS 36.213 v16.3.0, "E-UTRA, Physical Layer Procedures" (herein "REF 3"); 3GPP TS 36.321 v16.3.0, "E-UTRA, Medium Access Control (MAC) protocol specification" (herein "REF 4"); 3GPP TS 36.331 v16.3.0, "E-UTRA, Radio Resource Control (RRC) protocol specification" (herein "REF 5"); 3GPP TR 22.891 v14.2.0 (herein "REF 6"); 3GPP TS 38.212 v16.3.0, "E-UTRA, NR, Multiplexing and channel coding" (herein "REF 7"); 3GPP TS 38.214 v16.3.0, "E-UTRA, NR, Physical layer procedures for data" (herein "REF 8"); and 3GPP TS 38.213 v16.3.0, "E-UTRA, NR, Physical Layer Procedures for control" (herein "REF 9").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band.

Figure 2:
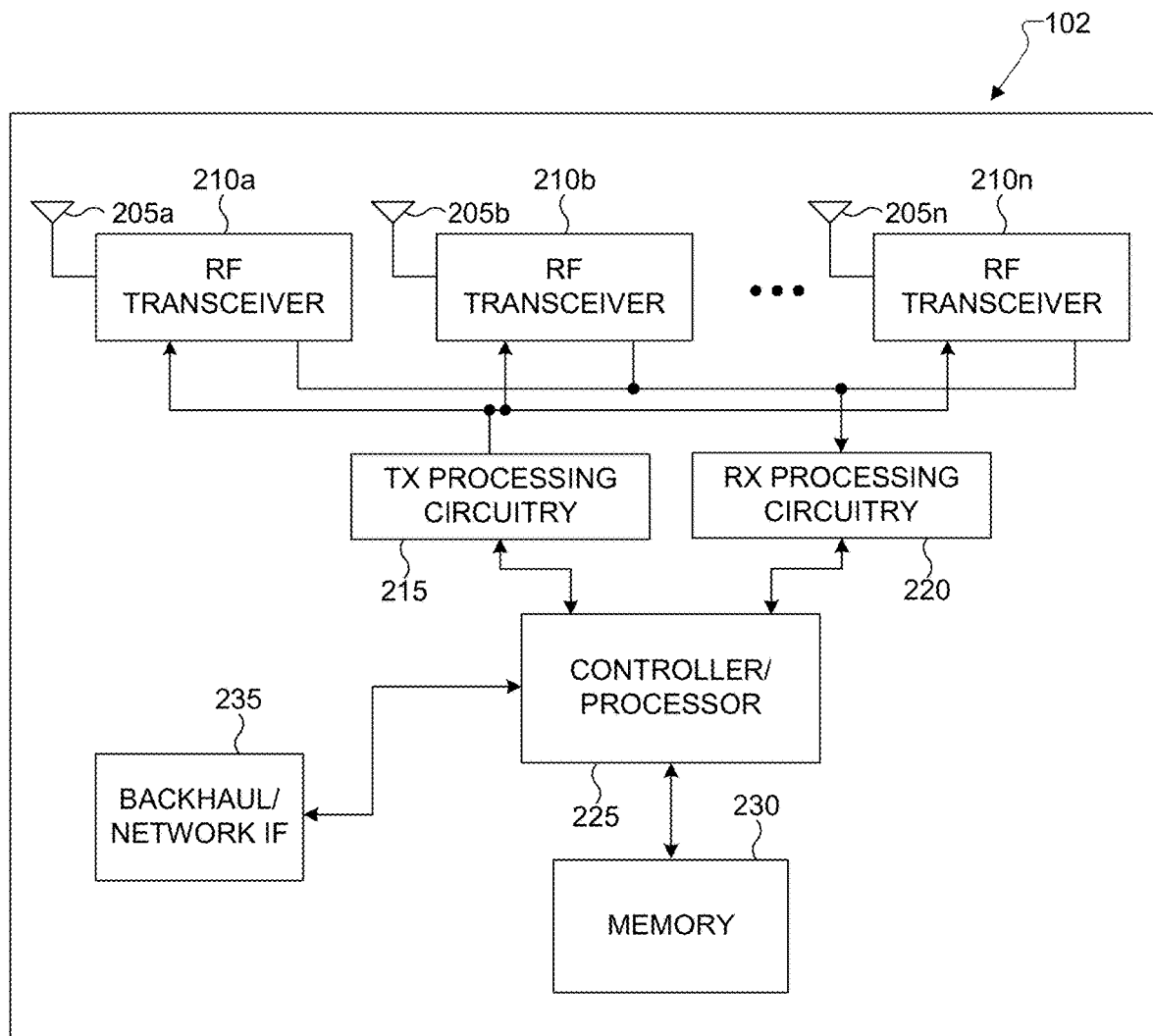
FIG. 2 illustrates an example gNB according to embodiments of the present disclosure.
Figure 3:
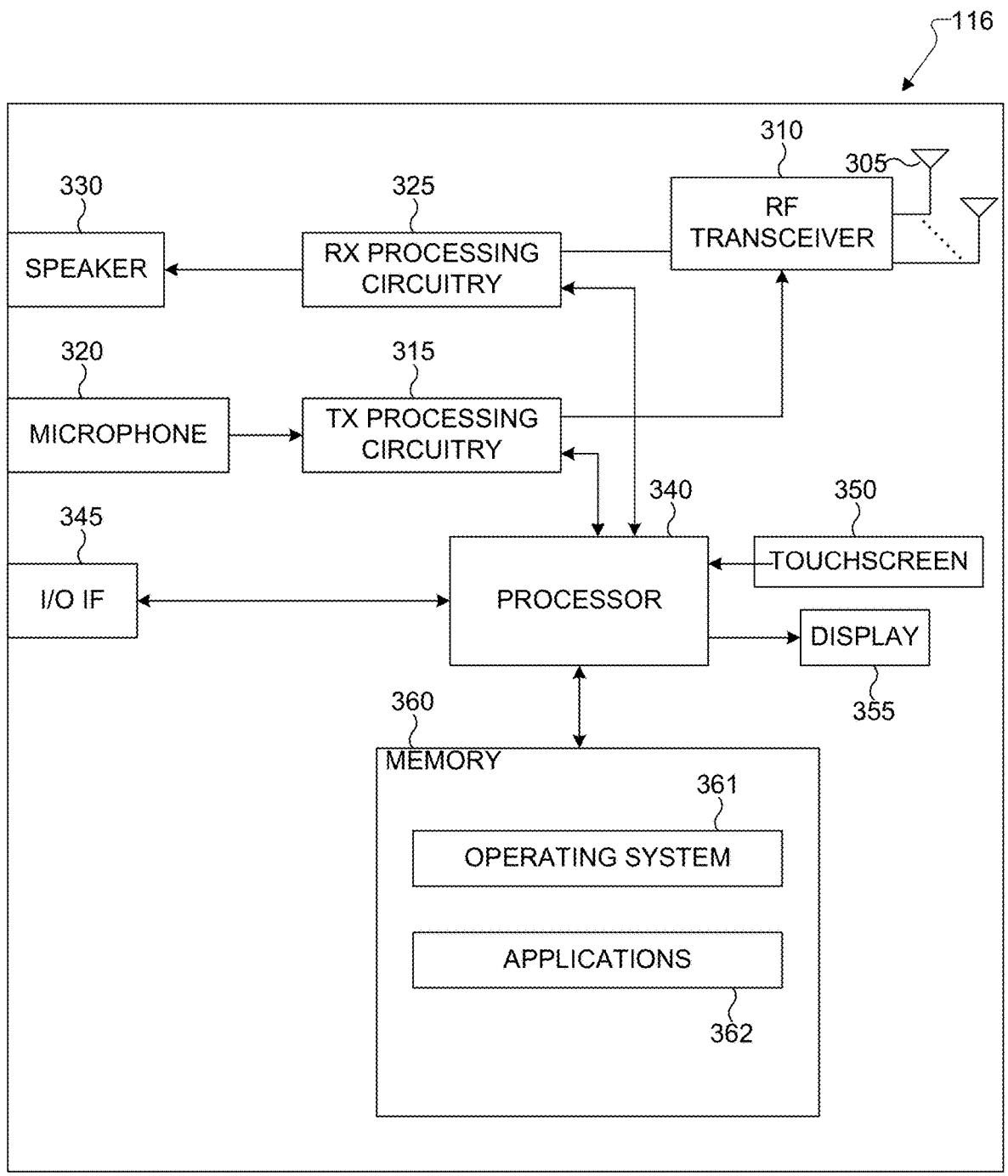
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information on a set of transmission configuration indicator (TCI) states; receiving a beam indication indicating at least one TCI state from the set of TCI states, wherein the at least one TCI state indicates a group of M beams partitioned into K sets of beams for K entities ($E_1, E_2, \ldots E_K$), where an i-th set of beams is associated with entity $E_i$; decoding the beam indication; determining a beam for entity $E_i$ based on the i-th set of beams; and transmitting an uplink (UL) transmission or receiving a downlink (DL) transmission based on the determined beam for entity $E_i$, wherein i is an entity index and takes a value from $\{1, \ldots, K\}$. One or more of the gNBs 101-103 includes circuitry, programing, or a combination thereof, for generating configuration information on a set of transmission configuration indicator (TCI) states; generating a beam indication indicating at least one TCI state from the set of TCI states, wherein the at least one TCI state indicates a group of M beams partitioned into K sets of beams for K entities ($E_1, E_2, \ldots E_K$), where an i-th set of beams is associated with entity $E_i$; transmitting the configuration information; transmitting the beam indication; and receiving an uplink (UL) transmission or transmitting a downlink (DL) transmission based on a beam for entity $E_i$ from the i-th set of beams, wherein i is an entity index and takes a value from $\{1, \ldots, K\}$.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information on a set of transmission configuration indicator (TCI) states; receiving a beam indication indicating at least one TCI state from the set of TCI states, wherein the at least one TCI state indicates a group of M beams partitioned into K sets of beams for K entities ($E_1, E_2, \ldots E_K$), where an i-th set of beams is associated with entity $E_i$; decoding the beam indication; determining a beam for entity $E_i$ based on the i-th set of beams; and transmitting an uplink (UL) transmission or receiving a downlink (DL) transmission based on the determined beam for entity $E_i$, wherein i is an entity index and takes a value from $\{1, \ldots, K\}$. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
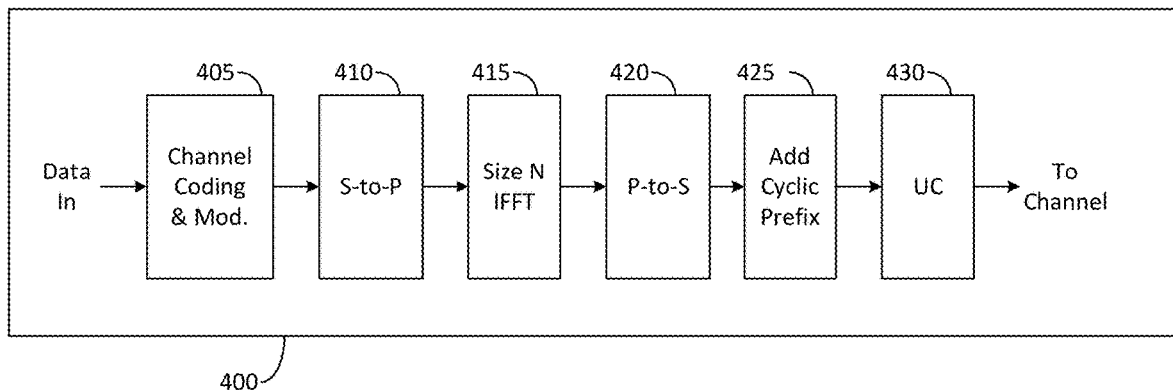
FIG. 4A illustrates a high-level diagram of an orthogonal frequency division multiple access transmit path according to embodiments of the present disclosure.
Figure 4B:
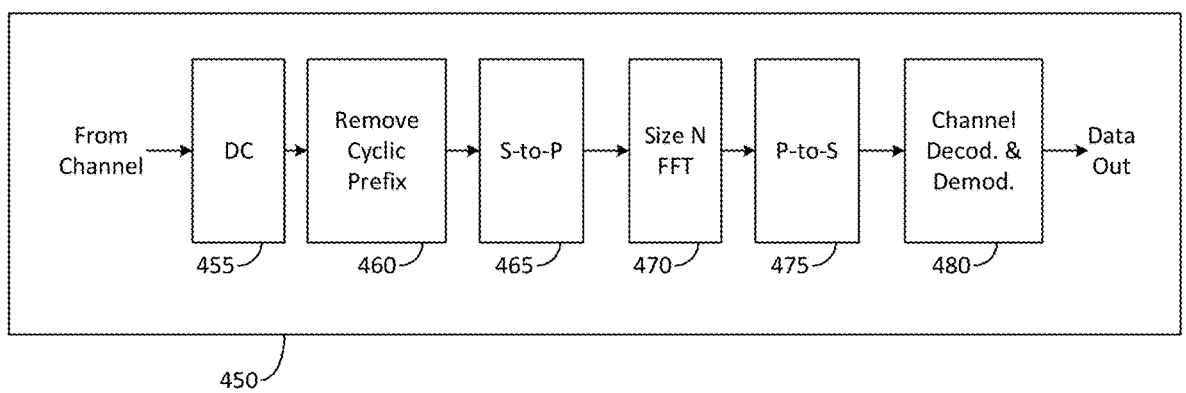
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNB s 101-103 and may implement a receive path corresponding to the architecture for receiving in the downlink from gNBs 101-103.

The 5G communication system use cases have been identified and described. Those cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}= M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
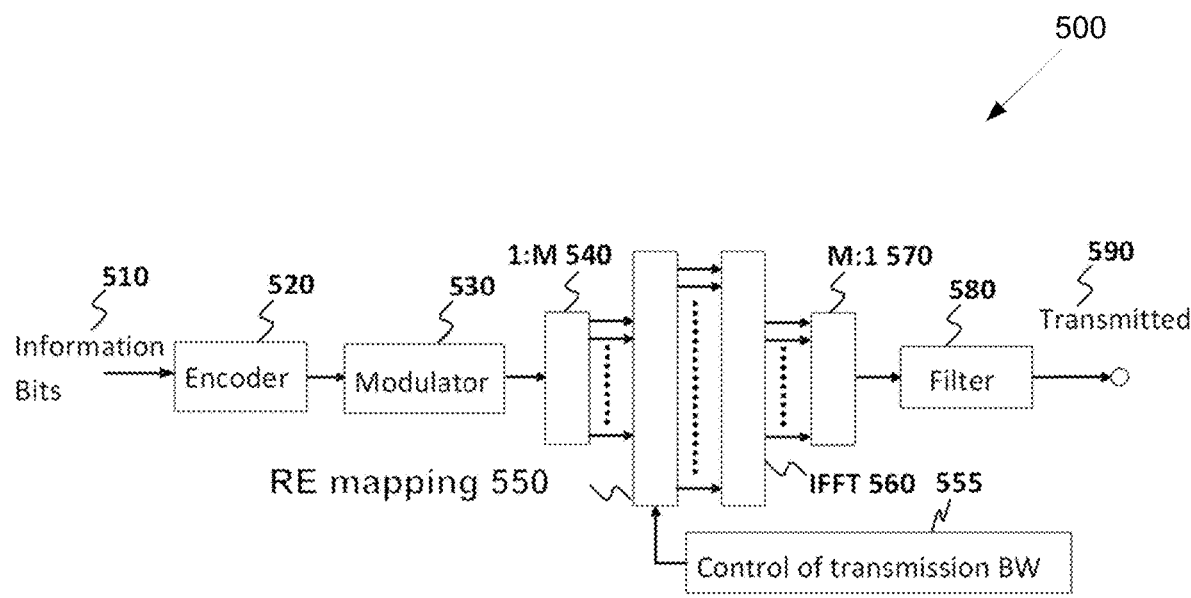
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
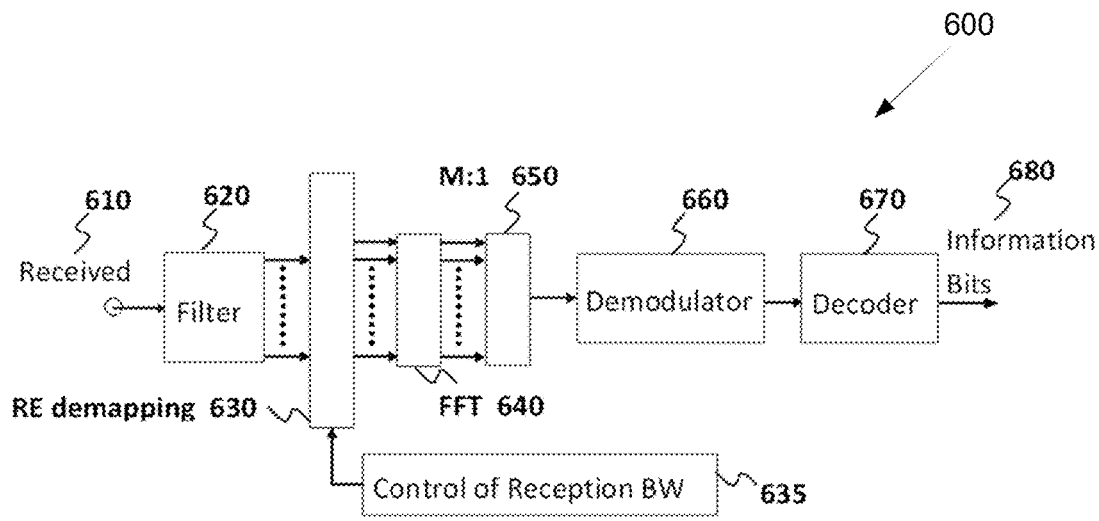
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
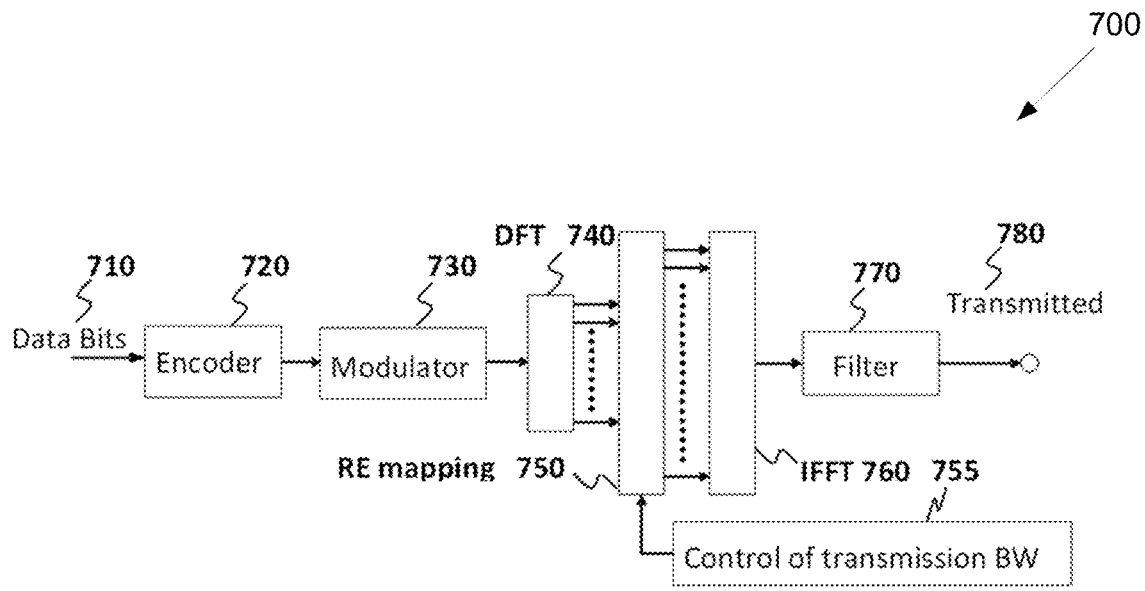
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
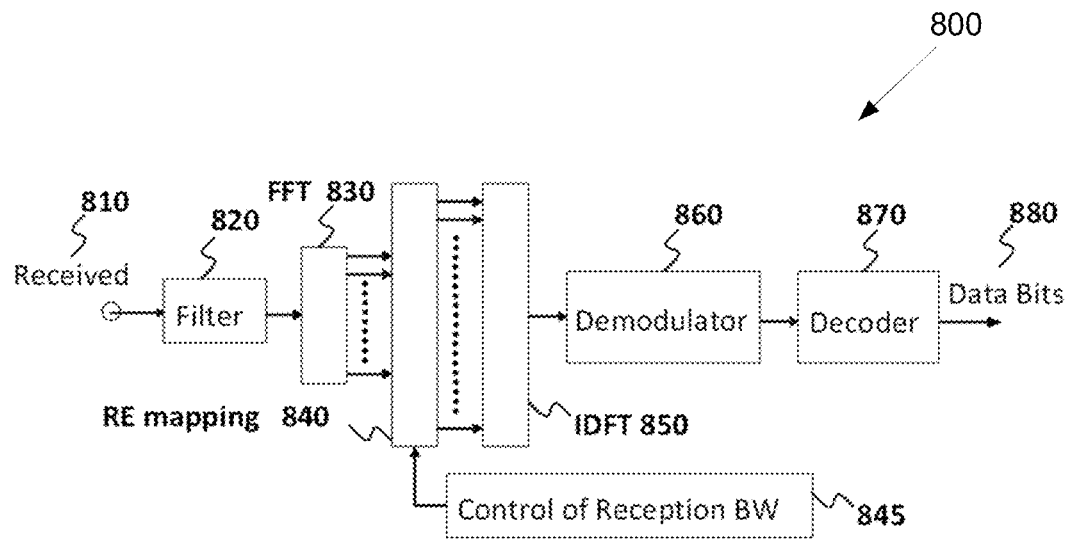
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

Figure 9:
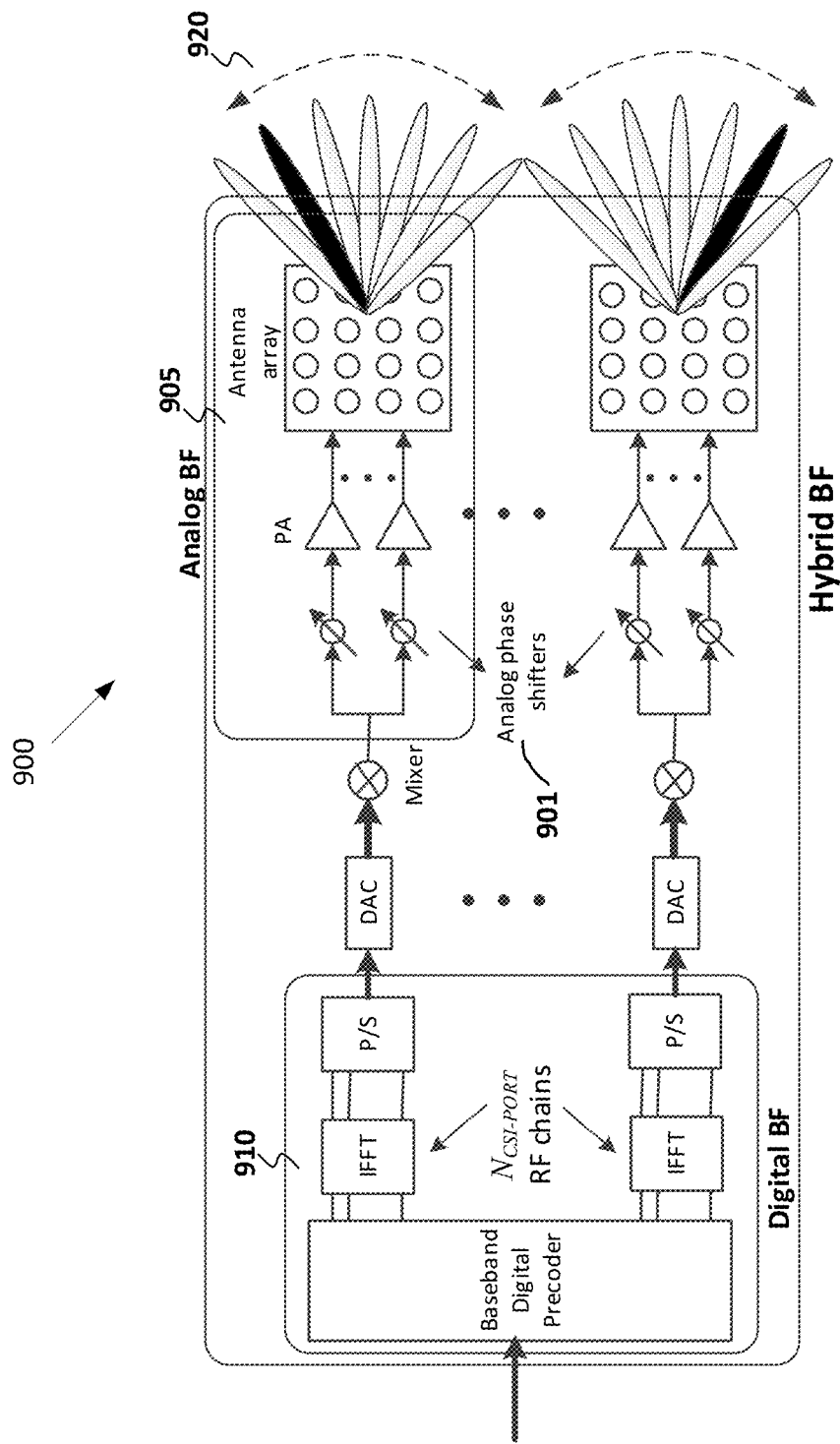
FIG. 9 illustrates an example antenna blocks according to embodiments of the present disclosure.

FIG. 9 illustrates an example antenna blocks 900 according to embodiments of the present disclosure. The embodiment of the antenna blocks 900 illustrated in FIG. 9 is for illustration only. FIG. 9 does not limit the scope of this disclosure to any particular implementation of the antenna blocks 900.

The 3GPP LTE and NR (new radio access or interface) specifications support up to 32 CSI-RS antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles 920 by varying the phase shifter bank across symbols or subframes. The number of sub-arrays (equal to the number of RF chains) is the same as the number of CSI-RS ports $N_{CSI\text{-}PORT}$. A digital beamforming unit 910 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Because the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @ 100 m distance), larger number of and sharper analog beams (hence larger number of radiators in the array) will be needed to compensate for the additional path loss.

In 3GPP LTE and NR, network access and radio resource management (RRM) are enabled by physical layer synchronization signals and higher (MAC) layer procedures. In particular, a UE attempts to detect the presence of synchronization signals along with at least one cell ID for initial access. Once the UE is in the network and associated with a serving cell, the UE monitors several neighboring cells by attempting to detect their synchronization signals and/or measuring the associated cell-specific RSs (for instance, by measuring their RSRPs). For next generation cellular systems, efficient and unified radio resource acquisition or tracking mechanism which works for various use cases (such as eMBB, URLLC, mMTC, each corresponding to a different coverage requirement) and frequency bands (with different propagation losses) is desirable. Most likely designed with a different network and radio resource paradigm, seamless and low-latency RRM is also desirable. Such goals pose at least the following problems in designing an access, radio resource, and mobility management framework.

First, since NR is likely to support even more diversified network topology, the notion of cell can be redefined or replaced with another radio resource entity. As an example, for synchronous networks, one cell can be associated with a plurality of TRPs (transmit-receive points) similar to a COMP (coordinated multipoint transmission) scenario in LTE. In this case, seamless mobility is a desirable feature. Second, when large antenna arrays and beamforming are utilized, defining radio resource in terms of beams (although possibly termed differently) can be a natural approach. Given that numerous beamforming architectures can be utilized, an access, radio resource, and mobility management framework which accommodates various beamforming architectures (or, instead, agnostic to beamforming architecture) is desirable. For instance, the framework should be applicable for or agnostic to whether one beam is formed for one CSI-RS port (for instance, where a plurality of analog ports are connected to one digital port, and a plurality of widely separated digital ports are utilized) or one beam is formed by a plurality of CSI-RS ports. In addition, the framework should be applicable whether beam sweeping (as illustrated in FIG. 9) is used or not. Third, different frequency bands and use cases impose different coverage limitations. For example, mmWave bands impose large propagation losses. Therefore, some form of coverage enhancement scheme is needed. Several candidates include beam sweeping (cf. FIG. 9), repetition, diversity, and/or multi-TRP transmission. For mMTC where transmission bandwidth is small, time-domain repetition is needed to ensure sufficient coverage.

A prerequisite to seamless access is significant reduction of higher-layer procedures for UEs which are already connected to the network. For instance, the existence of cell boundaries (or in general the notion of cells) necessitates RRC (L3) reconfiguration as a UE moves from one cell to another (i.e., inter-cell mobility). For heterogeneous networks with closed subscriber groups, additional overhead associated with higher layer procedures may further tax the system. This can be achieved by relaxing the cell boundaries thereby creating a large "super-cell" wherein a large number of UEs can roam. In this case, high capacity MIMO transmission (especially MU-MIMO) becomes more prevalent. While this presents an opportunity to increase system capacity (measured in terms of the number of sustainable UEs), it requires a streamlined MIMO design. This poses a challenge if applied in the current system.

Therefore, there is a need for an access, radio resource, and mobility management framework which facilitates seamless access by reducing the amount of higher layer procedures. In addition, there is also a need for a streamlined MIMO design that facilitates high capacity MIMO transmission.

In NR, multi-beam operation is designed primarily for single transmit-receive point (TRP) and single antenna panel. Therefore, the specification supports beam indication for one TX beam wherein a TX beam is associated with a reference RS. For DL beam indication and measurement, the reference RS can be NZP (non-zero power) CSI-RS and/or SSB (synchronization signal block, which includes primary synchronization signal, secondary synchronization signal, and PBCH). Here, DL beam indication is done via the transmission configuration indicator (TCI) field in DL-related DCI which includes an index to one (and only one) assigned reference RS. A set of hypotheses or the so-called TCI states is configured via higher-layer (RRC) signaling and, when applicable, a subset of those TCI states is selected/activated via MAC CE for the TCI field code points. For UL beam indication and measurement, the reference RS can be NZP CSI-RS, SSB, and/or SRS. Here, UL beam indication is done via the SRS resource indicator (SRI) field in UL-related DCI which is linked to one (and only one) reference RS. This linkage is configured via higher-layer signaling using the SpatialRelationInfo RRC parameter. Essentially, only one TX beam is indicated to the UE.

In NR, beam management was designed to share the same framework as CSI acquisition. This, however, compromises the performance of beam management especially for FR2. This is because beam management operates mainly with analog beams (characteristic of FR2) which paradigmatically differ from CSI acquisition (designed with FR1 in mind). Consequently, NR beam management becomes cumbersome and is unlikely able to keep up with more aggressive use cases which require large number of beams and fast beam switching (e.g., higher frequency bands, high mobility, and/or larger number of narrower analog beams). In addition, NR was designed to accommodate a number of unknown or rudimentary capabilities (e.g., UEs not capable of beam correspondence). To be flexible, it results in a number of options. This becomes burdensome to L1 control signaling and therefore a number of reconfigurations are performed via RRC signaling (higher-layer configuration). While this avoids L1 control overhead, it either results in high latency (if reconfiguration is performed sparsely) or imposes high usage of PDSCH (since RRC signaling consumes PDSCH resources).

In NR, the handover procedure to handle inter-cell mobility is similar to LTE, and relies heavily on RRC (and even higher layer) reconfigurations to update cell-specific parameters. These reconfigurations usually are slow, and incur large latency (up to several milliseconds). For high mobility UEs, this issue gets worse due to the need for more frequency handovers, hence more frequency RRC reconfigurations.

For high mobility UEs in FR2, the two latency issues mentioned above, one with the hierarchical NW structure (with visible cell boundaries) and the other with the beam management, compound together and make the latency issue much worse, and lead to frequent radio link failures (RLFs). Therefore, there is a need for solutions/mechanisms which can reduce RLFs for high mobility UEs in FR2. One such solution/mechanism based on group-based beam indication is proposed in this disclosure.

In the present disclosure, the term "activation" describes an operation wherein a UE receives and decodes a signal from the network (or gNB) that signifies a starting point in time. The starting point can be a present or a future slot/subframe or symbol—the exact location either implicitly or explicitly indicated, or otherwise fixed or higher-layer configured. Upon successfully decoding the signal, the UE responds accordingly. The term "deactivation" describes an operation wherein a UE receives and decodes a signal from the network (or gNB) that signifies a stopping point in time. The stopping point can be a present or a future slot/subframe or symbol—the exact location either implicitly or explicitly indicated, or otherwise fixed or higher-layer configured. Upon successfully decoding the signal, the UE responds accordingly.

Terminology such as TCI, TCI states, SpatialRelationInfo, target RS, reference RS, and other terms is used for illustrative purposes and therefore not normative. Other terms that refer to the same functions can also be used.

A "reference RS" corresponds to a set of characteristics of UL TX beam or DL RX beam, such as direction, precoding/ beamforming, number of ports, etc. For instance, for UL, as the UE receives a reference RS index/ID in an UL grant, the UE applies the known characteristics of the reference RS to the granted UL transmission. The reference RS can be received and measured by the UE (in this case, the reference RS is a downlink signal such as NZP CSI-RS and/or SSB) with the result of the measurement used for calculating a beam report. As the NW/gNB receives the beam report, the NW can be better equipped with information to assign a particular UL TX beam or DL RX beam to the UE. Optionally, the reference RS can be transmitted by the UE (in this case, the reference RS is a downlink signal such as SRS or DMRS). As the NW/gNB receives the reference RS, the NW/gNB can measure and calculate the needed information to assign a particular UL TX beam or DL RX beam to the UE.

The reference RS can be dynamically triggered by the NW/gNB (e.g., via DCI in case of aperiodic RS), preconfigured with a certain time-domain behavior (such as periodicity and offset, in case of periodic RS), or a combination of such pre-configuration and activation/deactivation (in case of semi-persistent RS).

For mmWave (or FR2) or higher frequency bands (such as >52.6 GHz or FR4) where multi-beam operation is especially relevant, transmission-reception process includes the receiver to select a receive (RX) beam for a given TX beam. For DL multi-beam operation, the UE selects a DL RX beam for every DL TX beam (which corresponds to a reference RS). Therefore, when DL RS (such as CSI-RS and/or SSB) is used as reference RS, the NW/gNB transmits the DL RS to the UE (which is associated with a selection of DL TX beam). In response, the UE measures the DL RS (and in the process selects a DL RX beam) and reports the beam metric associated with the quality of the DL RS. In this case, the UE determines the TX-RX beam pair for every configured (DL) reference RS. Therefore, although this knowledge is unavailable to the NW/gNB, the UE—upon receiving a DL RS (hence DL TX beam) indication from the NW/gNB—can select the DL RX beam from the knowledge on all the TX-RX beam pairs. On the other hand, when UL RS (such as SRS and/or DMRS) is used as reference RS (pertinent when DL-UL beam correspondence or reciprocity holds), the NW/gNB triggers or configures the UE to transmit the UL RS (for DL and by reciprocity, this corresponds to a DL RX beam). The gNB, upon receiving and measuring the UL RS, selects a DL TX beam. As a result, a TX-RX beam pair is derived. The NW/gNB can perform this operation for all the configured UL RSs (either per reference RS or "beam sweeping") and determine all the TX-RX beam pairs associated with all the UL RSs configured to the UE.

The following two embodiments (A-1 and A-2) are examples of DL multi-beam operations that utilize DL-TCI-based DL beam indication. In the first example embodiment (A-1), aperiodic CSI-RS is transmitted by the NW and measured by the UE. This embodiment can be used whether UL-DL beam correspondence holds or not. In the second example embodiment (A-2), aperiodic SRS is triggered by the NW and transmitted by the UE so that the NW (or a gNB) can measure the UL channel quality for the purpose of assigning a DL RX beam. This embodiment can be used when UL-DL beam correspondence holds. Although aperiodic RS is used in these two examples, periodic or semi-persistent RS can also be used.

Figure 10:
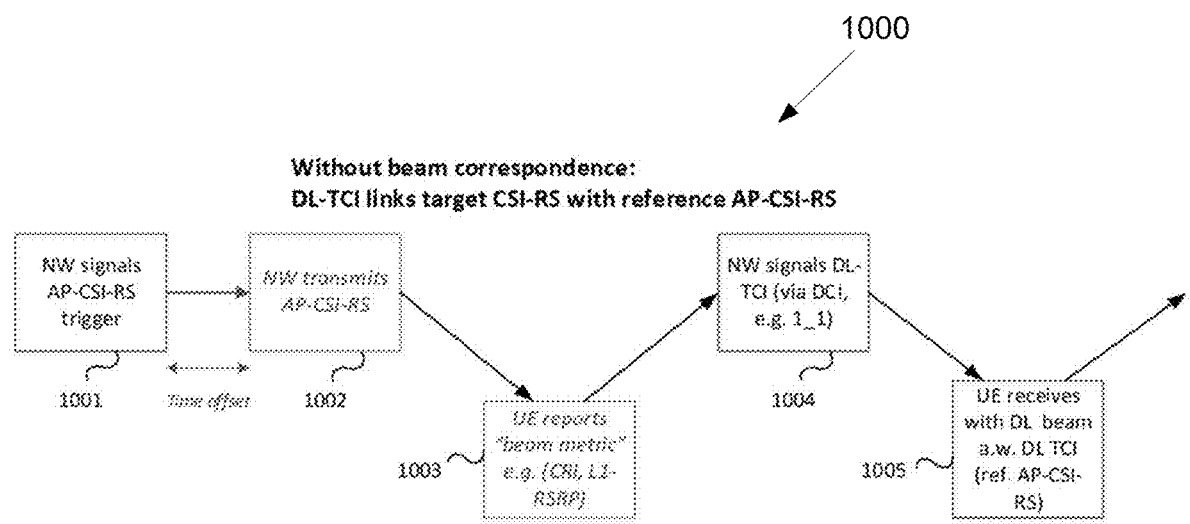
FIG. 10 illustrates a downlink multi-beam operation according to embodiments of the present disclosure.

In one example illustrated in FIG. 10 (embodiment A-1), a DL multi-beam operation 1000 is shown. The embodiment of the DL multi-beam operation 1000 illustrated in FIG. 10 is for illustration only. FIG. 10 does not limit the scope of this disclosure to any particular implementation of the DL multi-beam operation 1000.

The DL multi-beam operation 1000 starts with the gNB/NW signaling to a UE an aperiodic CSI-RS (AP-CSI-RS) trigger or indication (step 1001). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB/NW can use the beam report to select a DL RX beam for the UE and indicate the DL RX beam selection (step 1004) using the DL-TCI field in the DL-related DCI (that carries the DL grant, such as DCI format 1_1 in NR). In this case, the DL-TCI indicates a reference RS (in this case, an AP-CSI-RS) representing the selected DL TX beam (by the gNB/NW). In addition, the DL-TCI can also indicate a "target" RS (e.g., CSI-RS) that is linked to the reference RS (in this case, an AP-CSI-RS). Upon successfully decoding the DL-related DCI with the DL-TCI, the UE selects an DL RX beam and performs DL reception (such as data reception via PDSCH) with the DL RX beam associated with the reference CSI-RS (step 1005).

For this embodiment (A-1), as described above, the UE selects the DL RX beam from the reference RS (in this case AP-CSI-RS) index signaled via the DL-TCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

Figure 11:
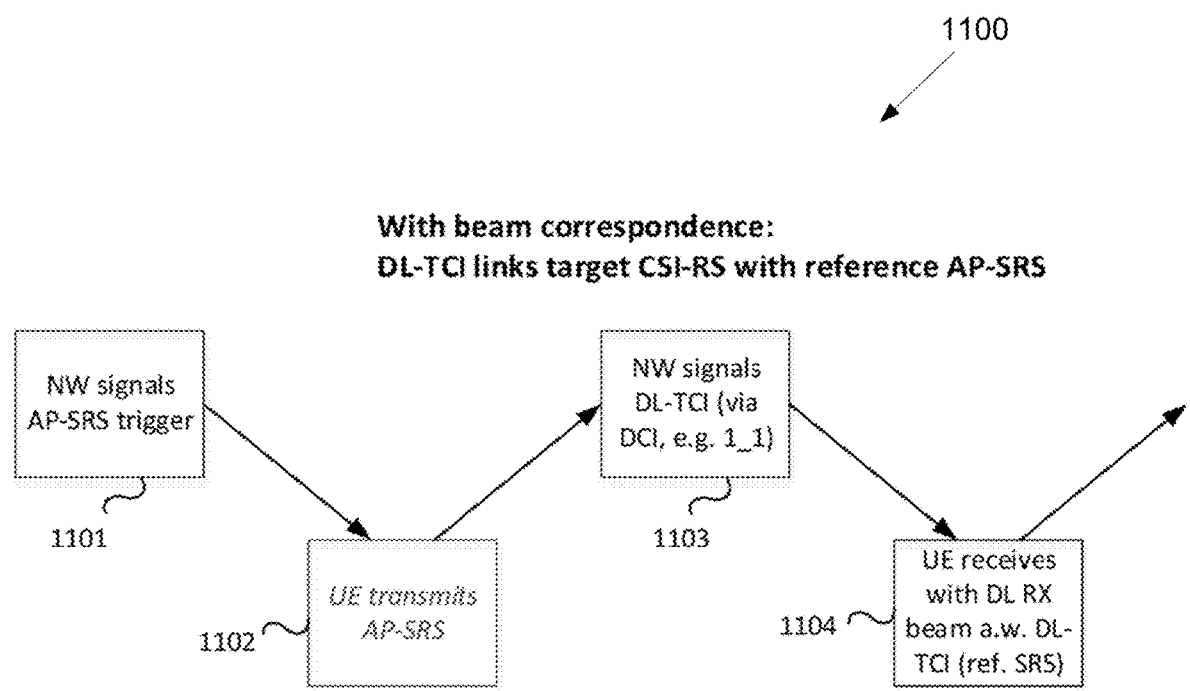
FIG. 11 illustrates a downlink multi-beam operation according to embodiments of the present disclosure.

In another example illustrated in FIG. 11 (embodiment A-2), a DL multi-beam operation 1100 is shown. The embodiment of the DL multi-beam operation 1100 illustrated in FIG. 11 is for illustration only. FIG. 11 does not limit the scope of this disclosure to any particular implementation of the DL multi-beam operation 1100.

The DL multi-beam operation 1100 starts with the gNB/NW signaling to a UE an aperiodic SRS (AP-SRS) trigger or request (step 1101). This trigger can be included in a DCI (either UL-related or DL-related). Upon receiving and decoding the AP-SRS trigger (step 1102), the UE transmits AP-SRS to the gNB/NW (step 1103) so that the NW (or gNB) can measure the UL propagation channel and select a DL RX beam for the UE for DL (assuming beam correspondence holds). The gNB/NW can then indicate the DL RX beam selection (step 1104) using the DL-TCI field in the DL-related DCI (that carries the DL grant, such as DCI format 1_1 in NR). In this case, the DL-TCI indicates a reference RS (in this case, an AP-SRS) representing the selected DL RX beam. In addition, the DL-TCI can also indicate a "target" RS (e.g., CSI-RS) that is linked to the reference RS (in this case, an AP-SRS). Upon successfully decoding the DL-related DCI with the DL-TCI, the UE performs DL reception (such as data reception via PDSCH) with the DL RX beam indicated by the DL-TCI (step 1105).

For this embodiment (A-2), as described above, the UE selects the DL RX beam based on the UL TX beam associated with the reference RS (AP-SRS) index signaled via the DL-TCI field.

Likewise, for UL multi-beam operation, the gNB selects an UL RX beam for every UL TX beam (which corresponds to a reference RS). Therefore, when UL RS (such as SRS and/or DMRS) is used as reference RS, the NW/gNB triggers or configures the UE to transmit the UL RS (which is associated with a selection of UL TX beam). The gNB, upon receiving and measuring the UL RS, selects an UL RX beam. As a result, a TX-RX beam pair is derived. The NW/gNB can perform this operation for all the configured reference RSs (either per reference RS or "beam sweeping") and determine all the TX-RX beam pairs associated with all the reference RSs configured to the UE. On the other hand, when DL RS (such as CSI-RS and/or SSB) is used as reference RS (pertinent when DL-UL beam correspondence or reciprocity holds), the NW/gNB transmit the RS to the UE (for UL and by reciprocity, this corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this knowledge is unavailable to the NW/gNB, the UE—upon receiving a reference RS (hence UL RX beam) indication from the NW/gNB—can select the UL TX beam from the knowledge on all the TX-RX beam pairs.

The following two embodiments (B-1 and B-2) are examples of UL multi-beam operations that utilize UL-TCI-based UL beam indication after the network (NW) receives some transmission from the UE. In the first example embodiment (B-1), aperiodic CSI-RS is transmitted by the NW and measured by the UE. This embodiment can be used, for instance, when reciprocity between the UL and DL beam-pair-link (BPL) holds. This condition is termed "UL-DL beam correspondence." In the second example embodiment (B-2), aperiodic SRS is triggered by the NW and transmitted by the UE so that the NW (or a gNB) can measure the UL channel quality for the purpose of assigning an UL TX beam. This embodiment can be used whether UL-DL beam correspondence holds or not. Although aperiodic RS is used in these two examples, periodic or semi-persistent RS can also be used.

Figure 12:
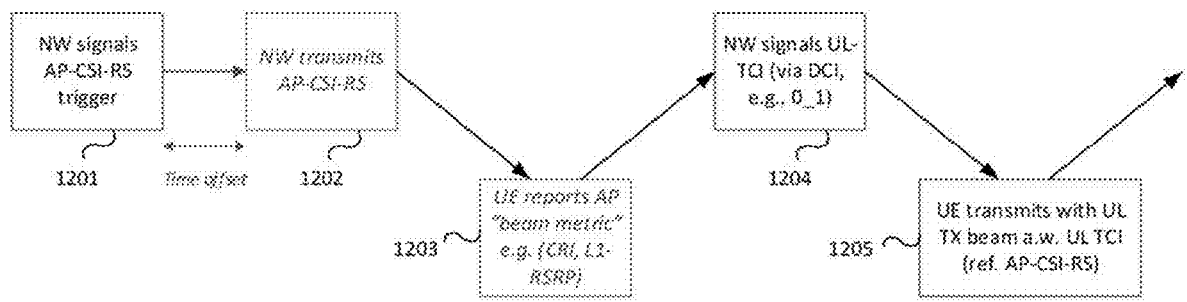
FIG. 12 illustrates an uplink multi-beam operation according to embodiments of the present disclosure.

In one example illustrated in FIG. 12 (embodiment B-1), an UL multi-beam operation 1200 is shown. The embodiment of the UL multi-beam operation 1200 illustrated in FIG. 12 is for illustration only. FIG. 12 does not limit the scope of this disclosure to any particular implementation of the UL multi-beam operation 1200.

The UL multi-beam operation 1200 starts with the gNB/NW signaling to a UE an aperiodic CSI-RS (AP-CSI-RS) trigger or indication (step 1201). This trigger or indication can be included in a DCI (either UL-related or DL-related, either separately or jointly signaled with an aperiodic CSI request/trigger) and indicate transmission of AP-CSI-RS in a same (zero time offset) or later slot/sub-frame (>0 time offset). Upon receiving the AP-CSI-RS transmitted by the gNB/NW (step 1202), the UE measures the AP-CSI-RS and, in turn, calculates and reports a "beam metric" (indicating quality of a particular TX beam hypothesis) (step 1203). Examples of such beam reporting are CSI-RS resource indicator (CRI) or SSB resource indicator (SSB-RI) coupled with its associated L1-RSRP/L1-RSRQ/L1-SINR/CQI.

Upon receiving the beam report from the UE, the gNB/NW can use the beam report to select an UL TX beam for the UE and indicate the UL TX beam selection (step 1204) using the UL-TCI field in the UL-related DCI (that carries the UL grant, such as DCI format 0_1 in NR). In this case, the UL-TCI indicates a reference RS (in this case, an AP-CSI-RS) representing the selected UL RX beam (by the gNB/NW). In addition, the UL-TCI can also indicate a "target" RS (e.g., SRS) that is linked to the reference RS (in this case, an AP-CSI-RS). Upon successfully decoding the UL-related DCI with the UL-TCI, the UE selects an UL TX beam and performs UL transmission (such as data transmission on PUSCH) with the UL TX beam associated with the reference CSI-RS (step 1205).

For this embodiment (B-1), as described above, the UE selects the UL TX beam based on the derived DL RX beam associated with the reference RS index signaled via the UL-TCI field. In this case, the CSI-RS resources (or, in general, the DL RS resources including CSI-RS, SSB, or a combination of the two) configured for the UE as the reference RS resources can be linked to (associated with) "beam metric" reporting such as CRI/L1-RSRP or L1-SINR.

Figure 13:
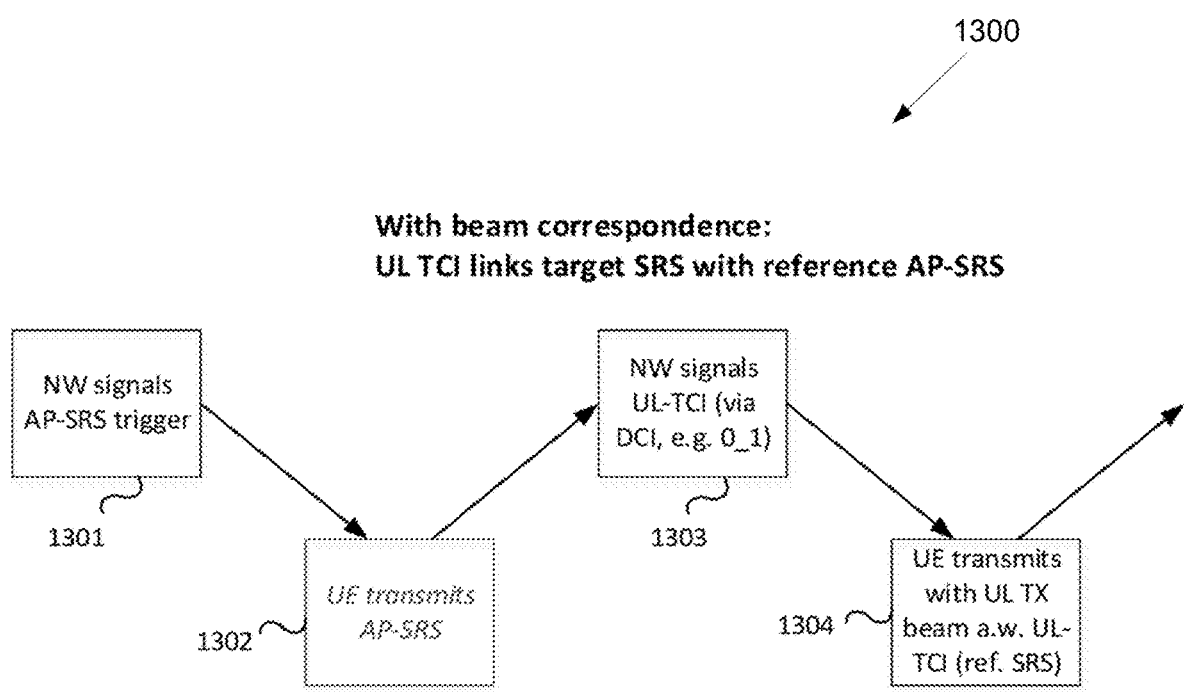
FIG. 13 illustrates an uplink multi-beam operation according to embodiments of the present disclosure.

In another example illustrated in FIG. 13 (embodiment B-2), an UL multi-beam operation 1300 is shown. The embodiment of the UL multi-beam operation 1300 illustrated in FIG. 13 is for illustration only. FIG. 13 does not limit the scope of this disclosure to any particular implementation of the UL multi-beam operation 1300.

The UL multi-beam operation 1300 starts with the gNB/NW signaling to a UE an aperiodic SRS (AP-SRS) trigger or request (step 1301). This trigger can be included in a DCI (either UL-related or DL-related). Upon receiving and decoding the AP-SRS trigger (step 1302), the UE transmits AP-SRS to the gNB/NW (step 1303) so that the NW (or gNB) can measure the UL propagation channel and select an UL TX beam for the UE.

The gNB/NW can then indicate the UL TX beam selection (step 1304) using the UL-TCI field in the UL-related DCI (that carries the UL grant, such as DCI format 0_1 in NR). In this case, the UL-TCI indicates a reference RS (in this case, an AP-SRS) representing the selected UL TX beam. In addition, the UL-TCI can also indicate a "target" RS (e.g., SRS) that is linked to the reference RS (in this case, an AP-SRS). Upon successfully decoding the UL-related DCI with the UL-TCI, the UE performs UL transmission (such as data transmission on PUSCH) with the UL TX beam indicated by the UL-TCI (step 1305).

For this embodiment (B-2), as described above, the UE selects the UL TX beam from the reference RS (in this case SRS) index signaled via the UL-TCI field.

In the above example embodiments, the DL and UL beam indication are separate (decoupled), i.e., the DL beam indication is based on DL-TCI indication and UL beam indication is based on UL-TCI. In U.S. patent application Ser. No. 16/902,179 filed on Jun. 15, 2020, the disclosure of which is incorporated by reference herein, a joint TCI that couples DL and UL beam indications (either partially or fully) is proposed. An example use case of the proposed joint TCI indication can be a reciprocal system in which UL-DL beam correspondence holds.

To facilitate fast beam management, one requirement is to streamline the foundational components (building blocks) for beam management. One functionality of beam management is beam selection which comprises functions such as beam measurement (including training), reporting (for DL beam management, reporting via UL control channel(s)), and indication (for DL and UL beam management, indication via DL control channel(s)). Once the building blocks are streamlined [step 1], additional advanced features to facilitate faster beam management can be added [step 2].

In U.S. patent application Ser. No. 16/949,246 filed on Oct. 21, 2020, the disclosure of which is incorporated by reference herein, a "slim mode" with streamlined designs of such foundational components [step 1] is proposed for fast beam management. The slim-mode design, due to its compact nature, can facilitate faster update/reconfiguration via lower-layer control signaling. In other words, L1 control signaling will be the primary signaling mechanism and higher-layer (such as MAC CE or RRC) is used only when necessary. Here, L1 control signaling includes the use of UE-group DCI as well as dedicated (UE-specific) DCI.

The aforementioned additional advanced features can include extensions of beam management (multi-beam operation) from intra-cell to inter-cell mobility. With such mechanism, seamless access/mobility for RRC_CONNECTED UEs—as if cell boundaries were not observed unless a UE is in initial access or initial-access-like condition—can be achieved. Another advanced feature includes mechanisms to minimize beam failure (BF) or radio link failure (RLF) such as low-overhead faster beam switching/selection and UE-initiated/event-triggered beam management. With such preventive mechanisms in place, beam failure recovery (BFR) will be less likely used.

In NR beam management (BM), the beam indication/reporting is associated with a resource ID (CRI indicating CSI-RS, SSBRI indicating SSB). There are at least the following drawbacks of such NR based beam indication/reporting.

D1: One drawback of such indication/reporting is the need for more frequent update of beam indication/reporting for high speed scenarios.

D2: Another drawback is that such beam indication/reporting are not robust against beam failures due to events such as beam/antenna blocking/failure (for both DL and UL) and the regulatory restriction on the maximum power emission (MPE) for UL.

D3: Yet another drawback is the need for large number of candidate beams (hence, large number of TCI states) in order to ensure a good coverage across cells, which results in large overhead and/or high latency associated with the beam indication.

In this disclosure, the above-mentioned drawbacks are addressed based on a beam indication/reporting scheme in which a group of multiple TCI states and/or reference RSs is indicated to a UE via a single beam indication/reporting, whenever possible. To address D1, when the UE moves at a predictable speed and/or trajectory relative to the gNB or the NW, the beam refinement and switching over a longer period of time can be to facilitated with only one DL beam indication signaling for DL (likewise, with only one UL beam indication signaling for UL). For instance, as proposed in U.S. patent application Ser. No. 17/094,580 filed Nov. 10, 2020 and in U.S. patent application Ser. No. 17/100,657 filed Nov. 20, 2020, the disclosures of which are incorporated by reference herein, for DL (likewise for UL) beam indication, the TCI field indicates the selected TCI state wherein one TCI state is associated with a sequence of source/reference RS (port) indices representing a sequence of DL (likewise for UL) TX beams the UE assumes over a period of time. To address D2, a UE can be indicated with multiple beams (TCI states and/or reference RSs) via a single TCI indication, and when the beam failure/blocking happens, the UE can switch to an alternate beam from the multiple beams. Likewise, to address D3, the total number of candidate beams can be grouped them a smaller number of beam groups, and instead of a single beam indication, the UE can be indicated with multiple beams via a single beam indication mechanism, hence both overhead and latency associated with the beam indication can be reduced.

In the rest of the disclosure, the term "beam", can be associated a spatial transmission of a resource signal (RS) from a "port", "antenna port", or "virtual antenna/port".

In NR, the DL spatial relation (such as QCL Type D which implies that two TX beams are associated with the same RX beam) is configured based on TCI state definition while UL spatial relation is configured via SpatialRelationInfo. The two configurations share neither the same framework nor the same signaling mechanism. For DL, the UE is indicated a DL TX beam via the TCI field in the respective DL-related DCI (which is a reference to the TX spatial filter/beam used by the associated SSB/CSI-RS resource). For UL, the UE is indicated an UL TX beam via the SRI field in the respective UL-related DCI (since UL beam indication is tied to UL transmission). This setup is not only inefficient but also creates unnecessary complication when DL RS is used for UL beam indication and vice versa. In particular, the link between source (reference) RS and target SRS is unnecessary for UL beam indication. The TCI state definition can be configured via higher-layer (RRC) signaling. Optionally, the TCI state definition can be configured via MAC CE. Optionally, a subset of the TCI states can be activated or selected either via MAC CE or L1 control signaling (via either UE-group DCI where a set of UEs share a same TCI state subset, or UE-specific/dedicated DCI). This subset constitutes the TCI states represented by the code points of the TCI field in the corresponding DCI. This update/activation can be performed in either one shot or incrementally. The TCI state indicated by the code point of the TCI field is a reference to the TX beam or the TX spatial filter associated with a reference RS. For DL, given such a reference, the UE can further derive the RX beam or RX spatial filter. The DCI that includes the TCI field (which can be either DL-related DCI or UL-related DCI) performs the function of the so-called "beam indication".

The same TCI-based mechanism can be used for both DL and UL beam indications, wherein M DL RSs and N UL RSs can be utilized for source (reference) RS. Examples of DL RS include NZP CSI-RS, SSB, and DL DMRS. Examples of UL RS include SRS and UL DMRS. The DL and/or UL RSs can be used for the purpose of reference RSs for DL and UL beam indications. Here, the TCI-based mechanism links/associates at least one of the DL and/or UL RSs from to a particular TCI state for a channel. For instance, DL RS 0 can be associated with the first TCI state for PDSCH and UL RS 0 with the second TCI state for PDSCH (wherein at least two TCI states are configured for PDSCH). Likewise, DL RS 1 can be associated with the first TCI state for PUSCH and UL RS 1 with the second TCI state for PUSCH (wherein at least two TCI states are configured for PUSCH). Such association/linkage can take form of the QCL Type D. For DL, two relevant channels include PDSCH and PDCCH while for UL, three relevant channels include PUSCH, PUCCH, and PRACH. Other components of this TCI-based mechanism such as target RS may or may not be needed.

In embodiment 1, the above TCI-based mechanism is used for a common beam (or TCI state) indication, which indicates a single (common) beam for a group of (or multiple) radio resource (RR) entities. Let us denote an entity type associated with an RR entity as X. A few examples of the entity type X include users/UEs, RSs, DL/UL channels, spatial domain components (such as antenna ports, antenna panels, and transmit and receive points (TRPs)), frequency domain components (such as component carriers (CCs) and bandwidth parts (BWPs)), and time domain components (such as slots and subframes).

In one embodiment (1.1), the entity type X corresponds to users/UEs, and hence the common beam (or TCI state) indication indicates a single (common) beam for a group of (or multiple) users/UEs. If the beam indication is for DL, each UE (in the group of UEs) determines its DL RX beam for DL reception (of DL RS or DL channel) based on the common beam indication. If the beam indication is for UL, each UE (in the group of UEs) determines its UL TX beam for UL transmission (of UL RS or UL channel) based on the common beam indication. If the beam indication is for both DL and UL, each UE (in the group of UEs) determines its DL RX beam for DL reception (of DL RS or DL channel) and UL TX beam for UL transmission (of UL RS or UL channel) based on the common beam indication.

In one example, such common beam indication is via UE-group or UE-common DCI where DCI is DL-related DCI (with or without DL assignment) or UL-related DCI (with or without UL grant).

In one embodiment (1.2), the entity type X corresponds to (target) RSs, and hence the common beam (or TCI state) indication indicates a single (common) beam for a group of (or multiple) RSs. If the beam indication is for DL, a UE determines its DL RX beam to receive the group of (target) RSs based on the common beam indication. If the beam indication is for UL, a UE determines its UL TX beam to transmit the group of (target) RSs based on the common beam indication. If the beam indication is for both DL and UL, a UE determines its DL RX beam to receive the (target) DL RSs (in the group of RSs) and its UL TX beam to transmit the (target) UL RSs (in the group of RSs) based on the common beam indication.

In one example, (target) RSs correspond to (target) DL RSs such as CSI-RS and DL DMRS. In one example, (target) RSs correspond to (target) UL RSs such as SRS and UL DMRS. In one example, (target) RSs correspond to a combination of (target) DL and UL RSs such as CSI-RS, SRS, DL DMRS, and UL DMRS.

In one embodiment (1.3), the entity type X corresponds to (DL and/or UL) channels, and hence the common beam (or TCI state) indication indicates a single (common) beam for a group of (or multiple) channels. If the beam indication is for DL, a UE determines its DL RX beam to receive the group of DL channels based on the common beam indication. If the beam indication is for UL, a UE determines its UL TX beam to transmit the group of UL channels based on the common beam indication. If the beam indication is for both DL and UL, a UE determines its DL RX beam to receive the DL channels (in the group of channels) and its UL TX beam to transmit the UL channels (in the group of channels) based on the common beam indication.

In one example, multiple channels correspond to DL channels such as PDCCH and PDSCH. In one example, multiple channels correspond to UL channels such as PUCCH, PDSCH, and PRACH. In one example, multiple channels correspond to both DL and UL channels such as PDCCH, PDSCH, PUCCH, PDSCH, and PRACH.

In one embodiment (1.4), the entity type X corresponds to frequency domain components such as CCs and BWPs, and hence the common beam (or TCI state) indication indicates a single (common) beam for a group of (or multiple) frequency components. If the beam indication is for DL, a UE determines its DL RX beam to receive DL for the group of frequency domain components based on the common beam indication. If the beam indication is for UL, a UE determines its UL TX beam to transmit UL for the group of frequency domain components based on the common beam indication. If the beam indication is for both DL and UL, a UE determines its DL RX beam to receive DL for frequency domain components (in the group of frequency domain components) and its UL TX beam to transmit UL for frequency domain components (in the group of frequency domain components) based on the common beam indication.

In one example, multiple frequency domain components correspond to CCs or BWPs within the same frequency band (i.e., intra-band CA such as EN-DC or NR-DC) regardless of the frequency range (FR) such as FR1, FR2 and FR4. There are two types of frequency range (FR) defined in 3GPP NR specifications. The sub-6 GHz range is called frequency range 1 (FR1) and millimeter wave range is called frequency range 2 (FR2). An example of the frequency range for FR1 and FR2 is shown below.

| Frequency range designation | Corresponding frequency range |
|---|---|
| FR1 | 450 MHz-6000 MHz |
| FR2 | 24250 MHz-52600 MHz |

In one example, another frequency range FR4 corresponds to frequency ≥52600 MHz.

In one example, multiple frequency domain components correspond to CCs or BWPs within the same frequency band (i.e., intra-band CA such as EN-DC or NR-DC), where the frequency band corresponds to FR1.

In one example, multiple frequency domain components correspond to CCs or BWPs within the same frequency band (i.e., intra-band CA such as EN-DC or NR-DC), where the frequency band corresponds to FR1 or FR2.

In one example, multiple frequency domain components correspond to CCs or BWPs within the same frequency band (i.e., intra-band CA such as EN-DC or NR-DC) or across two different frequency bands (i.e., inter-band CA), where the same frequency band corresponds to either FR1 or FR2 or FR4, and the two different frequency bands correspond to FR1.

In one example, multiple frequency domain components correspond to CCs or BWPs within the same frequency band (i.e., intra-band CA such as EN-DC or NR-DC) or across two different frequency bands (i.e., inter-band CA), where the same frequency band corresponds to either FR1 or FR2 or FR4, and the two different frequency bands correspond to FR1 or FR2 but not a combination of FR1 and FR2 (i.e., one frequency band corresponds to FR1 and the other to FR2).

In one example, multiple frequency domain components correspond to CCs or BWPs within the same frequency band (i.e., intra-band CA such as EN-DC or NR-DC) or across two different frequency bands (i.e., inter-band CA), where the same frequency band corresponds to either FR1 or FR2 or FR4, and the two different frequency bands correspond to FR1 or FR2 or a combination of FR1 and FR2 (i.e., one frequency band corresponds to FR1 and the other to FR2.

In one embodiment (1.5), the entity type X corresponds to spatial domain components such as antenna ports, antenna panels, and TRPs, and hence the common beam (or TCI state) indication indicates a single (common) beam for a group of (or multiple) spatial domain components. If the beam indication is for DL, a UE determines its DL RX beam to receive DL via the group of spatial domain components based on the common beam indication. If the beam indication is for UL, a UE determines its UL TX beam to transmit UL via the group of spatial domain components based on the common beam indication. If the beam indication is for both DL and UL, a UE determines its DL RX beam to receive DL via spatial domain components (in the group of spatial domain components) and its UL TX beam to transmit UL via spatial domain components (in the group of spatial domain components) based on the common beam indication.

In one example, multiple spatial domain components correspond to multiple antenna panels (e.g., for a UE equipped with multiple antenna panels). In one example, multiple spatial domain components correspond to multiple antenna ports (e.g., for a UE equipped with multiple antenna ports) where antenna ports can be associated with RS (such as DMRS, CSI-RS, SRS) and/or channel (such as PDSCH, PDCCH, PUSCH, PUCCH, PRACH). In one example, multiple spatial domain components correspond to multiple TRPs (e.g., for a UE equipped with receiving DL from or transmitting UL to multiple TRPs based on either dynamic TRP selection or simultaneous multi-TRP transmission/reception schemes).

Figure 16:
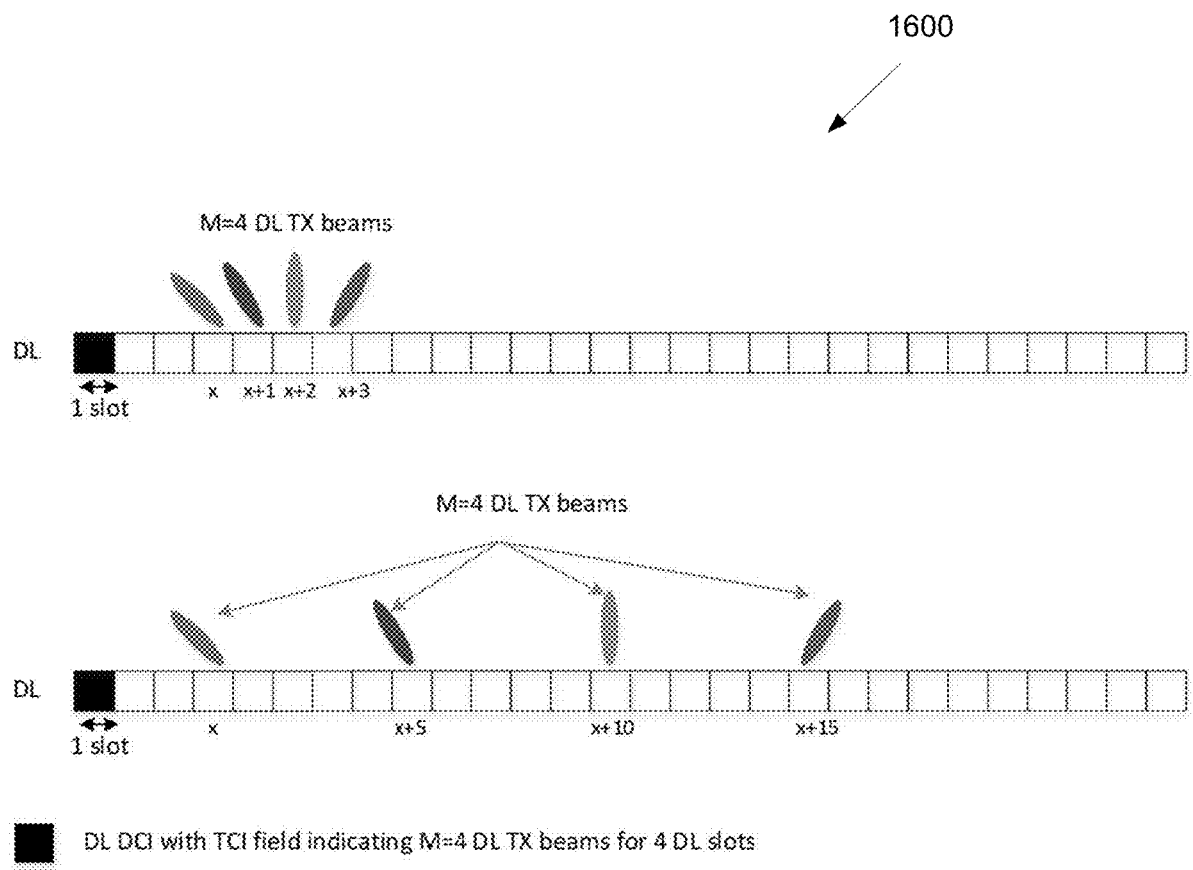
FIG. 16 illustrates examples of a group of TX beams as a function of time according to embodiments of the present disclosure.

In one embodiment (1.6), the entity type X corresponds to time domain components such as time slots and subframes, and hence the common beam (or TCI state) indication indicates a single (common) beam for a group of (or multiple) time domain components (slots or subframes) as illustrated in FIG. 16.

FIG. 16 illustrates examples of a group of TX beams as a function of time (slot or subframe) 1600 according to embodiments of the present disclosure. The embodiments of the example group of TX beams as a function of time 1600 illustrated in FIG. 16 is for illustration only. FIG. 16 does not limit the scope of this disclosure to any particular implementation of the example group of TX beams as a function of time 1600.

In one example, multiple time domain components correspond to a multiple slots or subframes, where the number of slots or subframes can be fixed or configured (e.g., via higher layer RRC or more dynamic MAC CE based or DCI based signaling), and the multiple slots or subframes are according to at least one of the following examples.

- In one example, the multiple slots or subframes are contiguous having indices x, x+1, x+2, and so on.
- In one example, the multiple slots or subframes are non-contiguous but they are equally spaced having indices x, x+y, x+2y, and so on.
- In one example, the multiple slots or subframes are non-contiguous, and their indices are either fixed or configured (e.g., via higher layer RRC signaling).

Here, x is a reference slot (or subframe) and y is a slot offset for DL beam switching. In one example, x can be fixed. Alternatively, x can be a function of UE speed. Or x can be configured. Alternatively, x can be reported by the UE. In another example, y can be fixed. Alternatively, y can be a function of UE speed. Alternatively, y can be configured. Alternatively, y can be reported by the UE.

In one embodiment (1.7), the entity type X corresponds to DL and UL, and hence the common beam (or TCI state) indication indicates a single (common) beam for both UL and DL transmissions.

In embodiments 1.1 through 1.7, the common beam (TCI state) indication can be for DL only (via DL TCI indication), or UL only (via UL TCI indication) or both DL and UL transmissions (via joint TCI indication).

Figure 14:
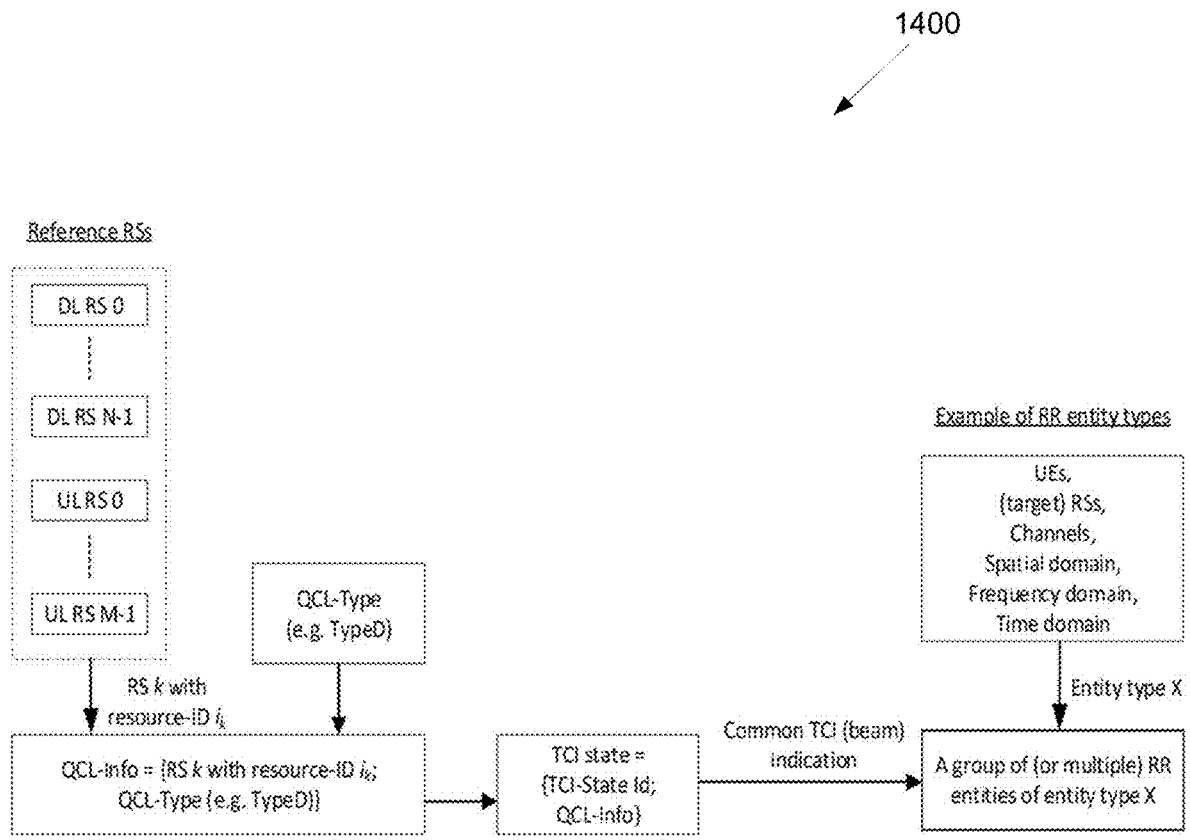
FIG. 14 illustrates an example of common beam indication according to embodiments of the present disclosure.

FIG. 14 illustrates an example of common beam indication 1400 according to embodiments of the present disclosure. The embodiment of the example common beam indication 1400 illustrated in FIG. 14 is for illustration only. FIG. 14 does not limit the scope of this disclosure to any particular implementation of the example common beam indication 1400.

An example of common beam indication according to embodiments 1.1 through 1.7 is shown in FIG. 14, wherein N DL RSs (DL RS 0, DL RS 1, ..., DL RS N−1) and M UL RSs (UL RS 0, UL RS 1, ..., UL RS M−1) are utilized as source (reference) RSs for the beam indication. Examples of DL RS include NZP CSI-RS, SSB, and DL DMRS. Examples of UL RS include SRS and UL DMRS. At least one of the N+M RSs (denoted as RS k) and a QCL-Type (e.g., TypeD) comprise a QCL-Info parameter, which is included in a TCI state. The TCI state is also associated with a TCI state ID. The TCI state is then indicated as a common beam indication for a group (or multiple) RR entities of an entity type X, where the entity type X can be one of the entity types mentioned in embodiments 1.1 through 1.7.

In one embodiment (1.8), the entity type X=(X1, X2) comprises two different RR entity types, X1 and X2, where X1 and X2 are any two entity types mentioned in embodiments 1.1 through 1.7. The common beam (or TCI state) indication indicates a single (common) beam for a group of (or multiple) entities, where the group of entities includes entities of both entity types X1 and X2. The rest of the details about the common beam indication remain the same as in the two embodiments (from embodiments 1.1 through 1.7) that are about entity types X1 and X2.

In one embodiment (1.9), the entity type X=(X1, X2, ..., $X_N$) comprises N>2 different RR entity types, X1, X2, ... $X_N$, where X1, X2, ... $X_N$ are any N entities entity types mentioned in embodiment 1.1 through 1.7. The common beam (or TCI state) indication indicates a single (common) beam for a group of (or multiple) entities, where the group of entities includes entities of entity types X1, X2, ... $X_N$. The rest of the details about the common beam indication remain the same as in the N embodiments (from embodiments 1.1 through 1.7) that are about entity types X1, X2 ... $X_N$.

In embodiment 2, the above TCI-based mechanism is used to facilitate indicating a set of (or multiple) DL or UL TX beams via a single (TCI state) indication, where the set of (or multiple) beams are indicated for a single RR entity (cf. embodiment 1). As explained in U.S. patent application Ser. No. 17/100,657 filed Nov. 20, 20200, at least one of the following embodiments can be used for this beam indication.

A set of K reference RSs can be configured for measurement via higher-layer (such as RRC) signaling to a UE. If beam correspondence does not hold, the K reference RSs can be NZP CSI-RS, SSB, DL DMRS, or any combination of those. For example, this set can be composed of NZP CSI-RS and SSB. Or it can be composed of NZP CSI-RS only. Or it can be composed of SSB only. If beam correspondence holds, the K reference RSs can be NZP CSI-RS, SSB, DL DMRS, SRS, UL DMRS, or any combination of those. Each reference RS can be associated with a resource ID of the particular type of RS. In one example, a reference RS can be associated with a TX beam or spatial domain filter, which NW/gNB (for DL RS) or UE (for UL RS) uses to beamform/precode the reference RS before its transmission. The choice of the TX beam or spatial domain filter is up to the NW/gNB (for DL RS) or UE (for US RS).

Figure 15:
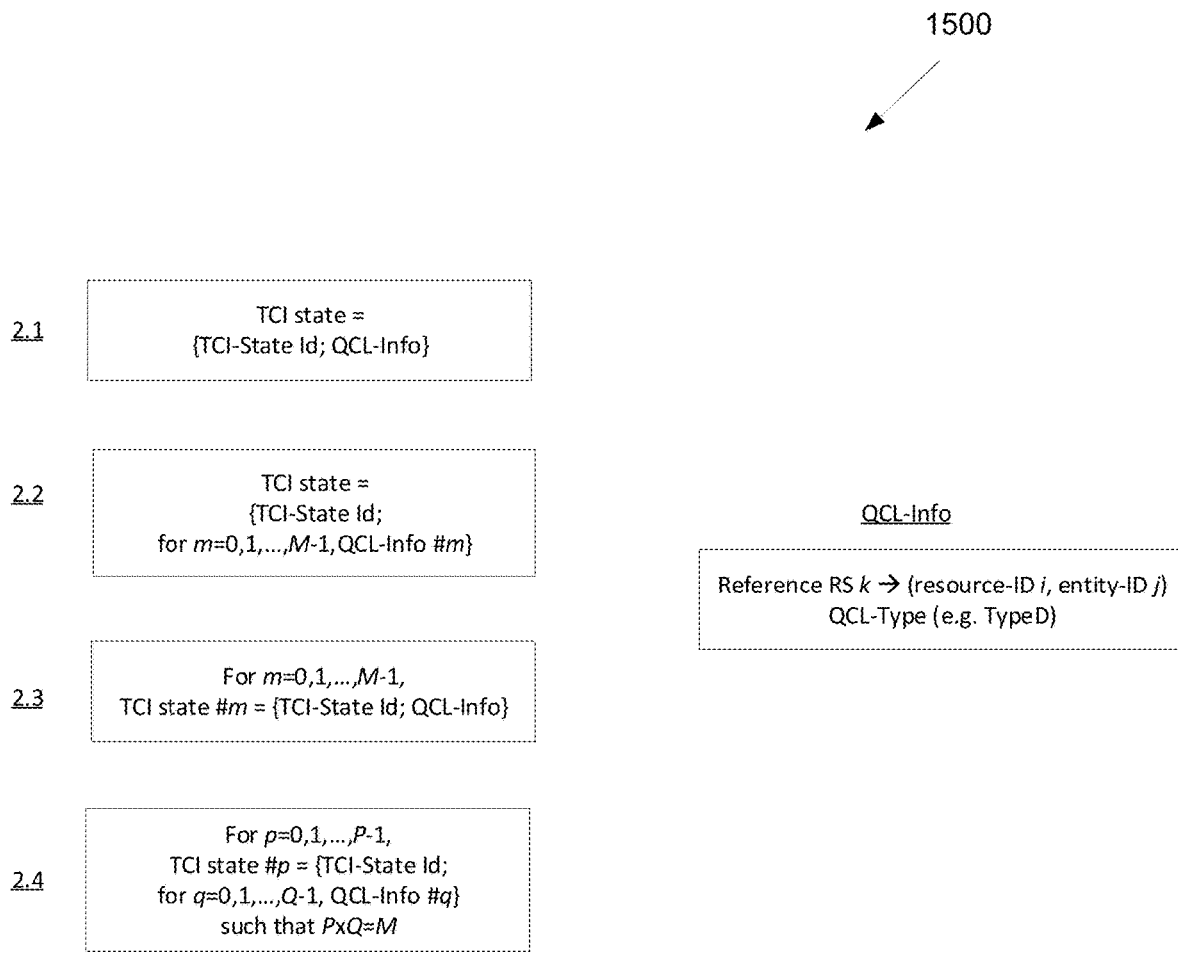
FIG. 15 illustrates beam indication mechanisms according to embodiments of the present disclosure.

FIG. 15 illustrates example beam indication mechanisms 1500 according to embodiments 2.1 through 2.4 discussed further below. The embodiment of the example beam indication mechanisms 1500 illustrated in FIG. 15 is for illustration only. FIG. 15 does not limit the scope of this disclosure to any particular implementation of the example beam indication mechanisms 1500.

In embodiment 2.1, the beam indication corresponds to a single DL (or likewise UL) TX beam, similar to the NR TCI-based beam indication mechanism. The TCI-based mechanism links/associates one of the K reference RSs to a particular TCI state for an RR entity such as channel or target RS (or other RR entities mentioned in embodiment 1). Such association can take form of the QCL TypeD, which represents a spatial relation or spatial domain filter (or beam or precoder).

In embodiment 2.2, the beam indication is based on reference RS grouping. The beam indication corresponds to a set (or group) of M>1 DL (or likewise UL) TX beams m=0, 1, 2, ..., M−1. The NR TCI-based mechanism can be reused to link/associate M out of the K reference RSs to a particular TCI state for an RR entity such as channel or target RS (or other RR entities mentioned in embodiment 1). Such association can take form of the QCL TypeD, which represents a spatial relation or spatial domain filter (or beam or precoder). The TCI state includes a TCI state ID and a set of QCL-Info parameters for M DL (or likewise UL) TX beams (where a beam is associated with one of the M reference RSs).

In embodiment 2.3, the beam indication is based on TCI state or QCL-Info grouping. The beam indication corresponds to a set (or group) of M>1 TCI states, where each TCI state includes a TCI state ID and a QCL-Info parameter indicating a single DL (or likewise UL) TX beam. The NR TCI-based mechanism can be reused to link/associate M out of the K reference RSs to the set (or group) of M>1 TCI states for an RR entity such as channel or target RS (or other RR entities mentioned in embodiment 1). Such association can take form of the QCL TypeD, which represents a spatial relation or spatial domain filter (or beam or precoder). Each TCI state in the set of TCI states includes a TCI state ID and a QCL-Info parameter indicating a single DL (or likewise UL) TX beam (where a beam is associated with one of the M reference RSs).

In embodiment 2.4, the beam indication is based on both TCI state and reference RS grouping. The beam indication corresponds to a set (or group) of P>1 TCI states, where each TCI state includes a TCI state ID and a set of QCL-Info parameters indicating a set of Q>1 DL (or likewise UL) TX beams such that P×Q=M. The NR TCI-based mechanism can be reused to link/associate M out of the K reference RSs to the set (or group) of P>1 TCI states (each comprising Q>1 reference RSs) for an RR entity such as channel or target RS (or other RR entities mentioned in embodiment 1). Such association can take form of the QCL TypeD, which represents a spatial relation or spatial domain filter (or beam or precoder). Each TCI state in the set of TCI states includes a TCI state ID and a QCL-Info parameter indicating a set of Q>1 DL (or likewise UL) TX beams (where a beam is associated with one of the M reference RSs).

In one example, N=M, where N is fixed or configured via higher layer (RRC) or reported by the UE. In another example, N≠M, where at least one of the following examples is used for N and M.

In one example, both N and M are fixed.
In one example, both N and M are configured via higher layer (RRC).
In one example, both N and M are reported by the UE.
In one example, N is fixed and M is configured via higher layer (RRC).
In one example, N is fixed and M is reported by the UE.
In one example, N is configured via higher layer (RRC) and M is fixed.
In one example, N is configured via higher layer (RRC) and M is reported by the UE.
In one example, N is reported by the UE and M is fixed.
In one example, N is reported by the UE and M is configured via higher layer (RRC).
In one example, M is fixed and N is configured via higher layer (RRC).
In one example, M is fixed and N is reported by the UE.
In one example, M is configured via higher layer (RRC) and N is fixed.
In one example, M is configured via higher layer (RRC) and N is reported by the UE.
In one example, M is reported by the UE and N is fixed.
In one example, M is reported by the UE and N is configured via higher layer (RRC).

In embodiment 2.5, the set of (or group of or multiple) TX beams (i.e., the group of reference RSs and/or the group of TCI states), indicated via a single TCI-based indication mechanism as explained in some embodiments (cf. embodiment 2.2, 2.3, and 2.4), can be sorted (indexed) based on a priority rule. A UE uses at least one TX beam from the group of TX beams according to the priority rule of the set of TX beams. At least one of the following alternatives is used for the priority rule.

In one alternative Alt 2.5.1: The priority rule is fixed (hence does not require any signaling/configuration or reporting). In one example, the priority rule is fixed based on an identity (ID) number. At least one of the following examples is used.

In one example 2.5.1.1, for multiple reference RSs in the group (cf. embodiment 2.2), the priority rule is based on resource-IDs of the reference RSs in the group. The reference RSs can be sorted (prioritized) according to the increasing order of their resource-IDs. Alternatively, the reference RSs can be sorted (prioritized) according to the decreasing order of their resource-IDs. Alternatively, the reference RSs can be sorted (prioritized) according to a fixed (pre-defined) order/permutation of their resource-IDs.

In one example 2.5.1.2, for multiple TCI states in the group (cf. embodiment 2.3), the priority rule is based on TCI state IDs of the TCI states in the group. The TCI states can be sorted (prioritized) according to the increasing order of their TCI state-IDs. Alternatively, the TCI states can be sorted (prioritized) according to the decreasing order of their TCI state-IDs. Alternatively, the TCI states can be sorted (prioritized) according to a fixed (pre-defined) order/permutation of their TCI state-IDs.

In one example 2.5.1.3, for both multiple TCI states and multiple reference RSs in the group (cf. embodiment 2.4), at least one of the following examples is used.

In one example 2.5.1.3.1, the priority rule is based on TCI state IDs of the TCI states. The TCI states can be sorted (prioritized) according to the increasing order of their TCI state-IDs. Alternatively, the TCI states can be sorted (prioritized) according to the decreasing order of their TCI state-IDs. Alternatively, the TCI states can be sorted (prioritized) according to a fixed (pre-defined) order/permutation of their TCI state-IDs. For multiple reference RSs in each TCI state, there is no priority, and a UE is free to select/prioritize any reference RS from the multiple reference RSs. The UE may indicate/report the selected reference RS to the NW/gNB.

In example 2.5.1.3.2, the priority rule is based on resource-IDs of the reference RSs. The reference RSs can be sorted (prioritized) according to the increasing order of their resource-IDs. Alternatively, the reference RSs can be sorted (prioritized) according to the decreasing order of their resource-IDs. Alternatively, the reference RSs can be sorted (prioritized) according to a fixed (pre-defined) order/permutation of their resource-IDs. For multiple TCI states, there is no priority, and a UE is free to select/prioritize any TCI state from the multiple TCI states. The UE may indicate/report the selected TCI state to the NW/gNB.

In one example 2.5.1.3.3, the priority rule is based on both TCI state IDs of the TCI states and resource-IDs of the reference RSs. At least one of the following examples is used.

In one example 2.5.1.3.3.1, the priority rule is based on two steps (TCI state IDs, then resource-IDs. In step 1, the multiple TCI states are prioritized first according to a priority method in example 2.5.1.3.1. The step 1 selects a TCI state from multiple TCI states. In step 2, the multiple reference RSs within the select TCI state (in step 1) are prioritized according to a priority method in example 2.5.1.3.2. The step 2 selects a reference RS from multiple reference RSs in the selected TCI state (in step 1).

In one example 2.5.1.3.3.2, the priority rule is based on two steps (resource-IDs, then TCI state IDs). In step 1, the multiple reference RSs are prioritized first according to a priority method in example 2.5.1.3.2. The step 1 selects a reference RS from multiple reference RSs. In step 2, the multiple TCI states that include the selected reference RS (in step 1) are prioritized according to a priority method in example 2.5.1.3.2. The step 2 selects a TCI state from multiple TCI states that include the selected reference RS (in step 1).

In one example 2.5.1.3.3.3, the priority rule is based on a fixed function F(r,t) of resource ID (r) and TCI state-ID (t). In one example, F(r,t)=r+t. In another example, (r,t)=a×r+t where a is a fixed number. In another example, (r,t)=r+b×t where b is a fixed number. In another example, (r,t)=a×r+b×t where a and b are fixed numbers. The group of TX beams (where each TX beam is associated with a resource-ID r and a TCI state-ID t) can be sorted (prioritized) according to the increasing order of the function F(r,t). Or, the group of TX beams (where each TX beam is associated with a resource-ID r and a TCI state-ID t) can be sorted (prioritized) according to the decreasing order of the function F (r,t). Alternatively, the group of TX beams (where each TX beam is associated with a resource-ID r and a TCI state-ID t) can be sorted (prioritized) according to a fixed (pre-defined) order/permutation of the function F(r,t).

In one alternative Alt 2.5.2: The priority rule is configured either with the beam indication (e.g., via DCI) or with a separate indication (e.g., higher layer RRC and/or MAC CE and/or DCI based signaling). At least one of the following examples is used.

In one example 2.5.2.1, for multiple reference RSs in the group (cf. embodiment 2.2), the priority rule is based on the configuration.

In one example 2.5.2.2, for multiple TCI states in the group (cf. embodiment 2.3), the priority rule is based on the configuration.

In one example 2.5.2.3, for both multiple TCI states and multiple reference RSs in the group (cf. embodiment 2.4), at least one of the following examples is used.

In one example 2.5.2.3.1, the priority rule is configured for multiple reference RSs, and the priority rule is fixed for multiple TCI states. For example, as explained in 2.5.1.3.1, the priority rule for multiple TCI states can be based on TCI state IDs of the TCI states.

In one example 2.5.2.3.2, the priority rule is configured for multiple TCI states, and the priority rule is fixed for multiple reference RSs. For example, as explained in 2.5.1.3.2, the priority rule for multiple reference RSs can be based on resource-IDs of the reference RSs.

In one example 2.5.2.3.3, the priority rule is configured for multiple reference RSs, and the priority rule is determined by the UE for multiple TCI states. The UE may or may not report the determined priority for multiple TCI states to the NW/gNB.

In one example 2.5.2.3.4, the priority rule is configured for multiple TCI states, and the priority rule is determined by the UE for multiple reference RSs. The UE may or may not report the determined priority for multiple reference RSs to the NW/gNB.

In one alternative Alt 2.5.3: The priority rule is determined by the UE (e.g., UE can determine the priority based on RS measurements) regardless of whether there are multiple reference RSs in the group (cf. embodiment 2.2) or there are multiple TCI states in the group (cf. embodiment 2.3) or there are for both multiple TCI states and multiple reference RSs in the group (cf. embodiment 2.4). The UE may or may not report the determined priority to the NW/gNB.

A few example use cases of this proposed grouped based beam reporting include the following. In one use case, the group based beam indication (together with the priority rules for secondary TX beams in the beam group) can avoid excessive L1 signaling (via DCI) and may be helpful for high mobility scenarios for faster beam tracking/switching. For instance, based on the speed and trajectory of the UE, the NW/gNB can link/associate a group of TX beams to one TCI state. The group of TX beams can be a function of time (slot or subframe) as illustrated in FIG. 16.

In another use case, the group based beam indication (together with the priority rules for secondary TX beams in the beam group) can provide flexibility and robustness to a UE against beam failure events (e.g., due to beam blocking). For example, when the UE is equipped with one antenna panel, the UE can switch to an alternative beam (or the reference RS with 2nd priority) for the panel if the current beam (or the reference RS with 1st priority) is not 'good' or starts to fail for the RR entity such as target RS, channel, or other RR entities mentioned in embodiment 1, without any urgent need for a new beam indication. Likewise, when the UE is equipped with multiple antenna panels and the group based beam indication indicates a TX beam (or reference RS) for each panel at the UE, then the UE can switch to a beam in an alternative panel (or the reference RS with 2nd priority panel) if the beam in the current panel (or the reference RS with 1st priority panel) is not 'good' or starts to fail for the RR entity such as target RS, channel, or other RR entities mentioned in embodiment 1, without any urgent need for a new beam indication.

Other uses cases (similar to the two use cases mentioned above) can be considered for other RR entities (such as CCs/BWPs, channels, etc.) that are mentioned in embodiment 1.

In embodiment 2.6, a UE is indicated with a set of (or group of or multiple) TX beams (i.e., the group of reference RSs and/or the group of TCI states) via a single TCI-based indication mechanism as explained in some embodiments (cf. embodiment 2.2, 2.3, and 2.4). If the beam indication is for DL, then the NW/gNB uses one TX beam from the group of TX beams (indicated to the UE) to transmit DL (target) RS and/or DL channel, but the UE is unaware of the TX beam that the NW/gNB uses. In one example, the UE performs a blind detection of the TX beam (out of the group of TX beams). This detection can be based on DL RS measurements performed in one or more previous time instances (such as slots or subframes), which may or may not include the current time instance. Likewise, if the beam indication is for UL, then the UE uses one TX beam from the group of TX beams (indicated to the UE) to transmit UL (target) RS and/or UL channel, but the NW/gNB is unaware of the TX beam that the UE uses. In one example, the NW/gNB performs a blind detection of the TX beam (out of the group of TX beams). This detection can be based on UL RS measurements performed in one or more previous time instances (such as slots or subframes), which may or may not include the current time instance.

In embodiment 2.7, a UE is indicated/configured with a two-level beam (or TCI) indication, wherein the first level beam indication indicates a set of (or group of or multiple) TX beams (i.e., the group of reference RSs and/or the group of TCI states), as explained in some embodiments (cf. embodiment 2.2, 2.3, and 2.4), and the second level beam indication indicates a (single) TX beam from the set of TX beams (indicated via the first level beam indication). In one example, the first level beam indication is via a dedicated DCI (without DL assignment or UL grant), and the second level beam indication is via DL-related DCI (with DL assignment) or UL-related DCI (with UL grant). In another example, the first level beam indication is via a first DCI (with DL assignment or UL grant), and the second level beam indication is via second DCI (DL-related DCI with DL assignment or UL-related DCI with UL grant). In another example, the first level beam indication is via MAC CE based signaling, and the second level beam indication is via second DCI (DL-related DCI with DL assignment or UL-related DCI with UL grant).

In embodiment 3, the TCI-based mechanism is used to facilitate indicating a set of (or multiple) DL or UL TX beams via a single (TCI state) indication, where the set of (or multiple) beams are indicated common for multiple RR entities (cf. embodiment 1). That is, a single TCI indication is used to indicate a set of (or multiple) DL or UL TX beams that are common for multiple RR entities. The details about the set of (or multiple) DL or UL TX beams are according to embodiment 2. The details about the common beam indication for multiple RR entities are according to embodiment 1.

Several example embodiments are provided for the beam (TCI) indication, where the details about the TCI state is according to some embodiments of this disclosure.

In embodiment 4.0, a UE is configured/indicated with the information about whether the beam (or TCI state) indication indicates a single beam (TCI state) or a set of (or multiple) beams (TCI states), where the details about the of set of beams is according to some embodiments of this disclosure. This grouping information can be separate from the beam (TCI state) indication, or it can be joint with the beam TCI state) indication. In one example, this grouping information is configured via RRC based higher layer signaling using either a separate RRC parameter or an existing RRC parameter. In one example, this grouping information is configured via MAC CE based signaling using either a separate MAC CE parameter or an existing MAC CE parameter. In one example, this grouping information is configured via DCI based signaling using either a separate DCI parameter or an existing DCI parameter. In one example, this grouping information is configured via a combination of RRC and MAC CE based signaling. In one example, this grouping information is configured via a combination of MAC CE and DCI based signaling. In one example, this grouping information is configured via a combination of RRC, MAC CE and DCI based signaling.

In embodiment 4.1, the beam (or TCI) state indication is performed in three levels.

Level 3 (L3): a set of K reference RSs is configured.

Level 2 (L2): a set of M TCI states (out of K reference RSs) is formed/activated/configured.

Level 1 (L1): a subset of $M_1$ TCI states (out of M TCI states), where $M_1 < M$, is indicated/triggered from the activated set of M TCI states. In one example, $M_1=1$.

The signaling alternatives for L1-L3 are one of Alt1-Alt3 shown in Table 1. According to Alt1, L3 is signaled via higher layer RRC signaling, L2 is signaled via MAC CE based activation/signaling, and L1 is signaled via DCI based triggering. According to Alt2, L3 is signaled via MAC CE based activation/signaling, and L2 and L1 are signaled via two separate DCI based triggering, DCI2 for L2 and DCI1 for L1. According to Alt3, L3, L2, and L1 are signaled via three separate DCI based triggering, DCI3 for L3, DCI2 for L2 and DCI1 for L1.

TABLE 1

| | signaling alternatives | | |
|---|---|---|---|
| Alt | L3 | L2 | L1 |
| Alt1 | RRC | MAC CE | DCI |
| Alt2 | MAC CE | DCI2 | DCI1 |
| Alt3 | DCI3 | DCI2 | DCI1 |

In one example, the TCI state indications for DL and UL are performed separately based on embodiment 4.1. In another example, the TCI state indications for DL and UL are based on embodiment 4.1, and they have some common components (or levels). For instance, In one example, all three levels (L1-L3) are common for DL and UL, and the TCI state corresponds to a joint TCI (J-TCI) state, as proposed in U.S. patent application Ser. No. 16/902,179 filed on Jun. 15, 2020.

In another example, L3 is common for DL and UL, and (L1, L2) is separate for DL and UL.

In another example, (L2, L3) is common for DL and UL, and L1 is separate for DL and UL.

In another example, (L1, L2, L3) is separate for DL and UL.

In another example, the TCI state indications for two RR entities (cf. embodiment 1) are performed separately based on embodiment 4.1. In another example, the TCI state indications for two RR entities (cf. embodiment 1) are based on embodiment 4.1, and they have some common components (or levels). For instance, In one example, all three levels (L1-L3) are common for two RR entities, and the TCI state corresponds to a joint TCI (J-TCI) state, as proposed in U.S. patent application Ser. No. 16/902,179 filed on Jun. 15, 2020.

In another example, L3 is common for two RR entities, and (L1, L2) is separate for two RR entities.

In another example, (L2, L3) is common for two RR entities, and L1 is separate for two RR entities.

In another example, (L1, L2, L3) is separate for two RR entities.

In embodiment 4.2, the beam (or TCI) state indication is performed in three levels.
  Level 3 (L3): a set of K reference RSs is configured.
  Level 2 (L2): a set of M reference RSs (out of K reference RSs) is formed/activated/configured.
  Level 1 (L1): a set of $M_1$ TCI states (out of M reference RSs), where $M_1 < M$, is indicated/triggered. In one example, $M_1 = 1$.

The signaling alternatives for L1-L3 are one of Alt1-Alt3 shown in Table 1. According to Alt1, L3 is signaled via higher layer RRC signaling, L2 is signaled via MAC CE based activation/signaling, and L1 is signaled via DCI based triggering. According to Alt2, L3 is signaled via MAC CE based activation/signaling, and L2 and L1 are signaled via two separate DCI based triggering, DCI2 for L2 and DCI1 for L1. According to Alt3, L3, L2, and L1 are signaled via three separate DCI based triggering, DCI3 for L3, DCI2 for L2 and DCI1 for L1.

In one example, the TCI state indications for DL and UL are performed separately based on embodiment 4.2. In another example, the TCI state indications for DL and UL are based on embodiment 4.2, and they have some common components (or levels). For instance,
  In one example, all three levels (L1-L3) are common for DL and UL, and the TCI state corresponds to a joint TCI (J-TCI) state, as proposed in U.S. patent application Ser. No. 16/902,179 filed on Jun. 15, 2020.
  In another example, L3 is common for DL and UL, and (L1, L2) is separate for DL and UL.
  In another example, (L2, L3) is common for DL and UL, and L1 is separate for DL and UL.
  In another example, (L1, L2, L3) is separate for DL and UL.

In another example, the TCI state indications for two RR entities (cf. embodiment 1) are performed separately based on embodiment 4.2. In another example, the TCI state indications for two RR entities (cf. embodiment 1) are based on embodiment 4.2, and they have some common components (or levels). For instance,
  In one example, all three levels (L1-L3) are common for two RR entities, and the TCI state corresponds to a joint TCI (J-TCI) state, as proposed in U.S. patent application Ser. No. 16/902,179 filed on Jun. 15, 2020.
  In another example, L3 is common for two RR entities, and (L1, L2) is separate for two RR entities.
  In another example, (L2, L3) is common for two RR entities, and L1 is separate for two RR entities.
  In another example, (L1, L2, L3) is separate for two RR entities.

In embodiment 4.3, the beam (or TCI) state indication is performed in three levels.
  Level 3 (L3): a set of K TCI state groups is configured, where K>1 and each TCI state group includes a set of fixed number (say M) of TCI states.
  Level 2 (L2): one TCI state group (out of K TCI states groups) is activated/selected.
  Level 1 (L1): a set of $M_1$ TCI states (out of M TCI states in the selected TCI state group), where $M_1 < M$, is indicated/triggered. In one example, $M_1 = 1$.

In a variation, one or more than one TCI state groups can be selected in L2. The signaling alternatives for L1-L3 are one of Alt1-Alt3 shown in Table 1. According to Alt1, L3 is signaled via higher layer RRC signaling, L2 is signaled via MAC CE based activation/signaling, and L1 is signaled via DCI based triggering. According to Alt2, L3 is signaled via MAC CE based activation/signaling, and L2 and L1 are signaled via two separate DCI based triggering, DCI2 for L2 and DCI1 for L1. According to Alt3, L3, L2, and L1 are signaled via three separate DCI based triggering, DCI3 for L3, DCI2 for L2 and DCI1 for L1.

In embodiment 4.4, the beam (or TCI) state indication is performed in two levels.
  Level 3 (L3): a set of K TCI state groups is configured, where K>1 and each TCI state group includes a set of fixed number (say M) of TCI states.
  Level 2 (L2): one TCI state group (out of K TCI states groups) is activated/selected.

In a variation, one or more than one TCI state groups can be selected in L2. In one alternative of signaling, L3 is signaled via higher layer RRC signaling and L2 is signaled via MAC CE based activation/signaling. In another alternative of signaling, L3 is signaled via MAC CE based activation/signaling and L2 is signaled via DCI based triggering.

For any of the embodiments or sub-embodiments, the terms TCI, J-TCI, DL-TCI, and UL-TCI field are used for illustrative purposes. Other terms and/or other DCI fields that are of a same functionality (that is, referring to at least one pre-configured TCI, J-TCI, DL-TCI, or UL-TCI state) can be used and are therefore covered in the present disclosure. For instance, the function of the UL-TCI field can also be achieved by reusing the existing SRI field in DCI format 0_1 in Rel.15 NR. In this case, however, the SRI field is interpreted not according to the SpatialRelationInfo specified in Rel.15 NR, but the UL TCI state definition (that includes a list of reference RS resource IDs) described above. This SRI field can also be extended to accommodate more UL TCI hypotheses, either with one configured SRS resource or more than one configured SRS resources as described above.

Figure 17:
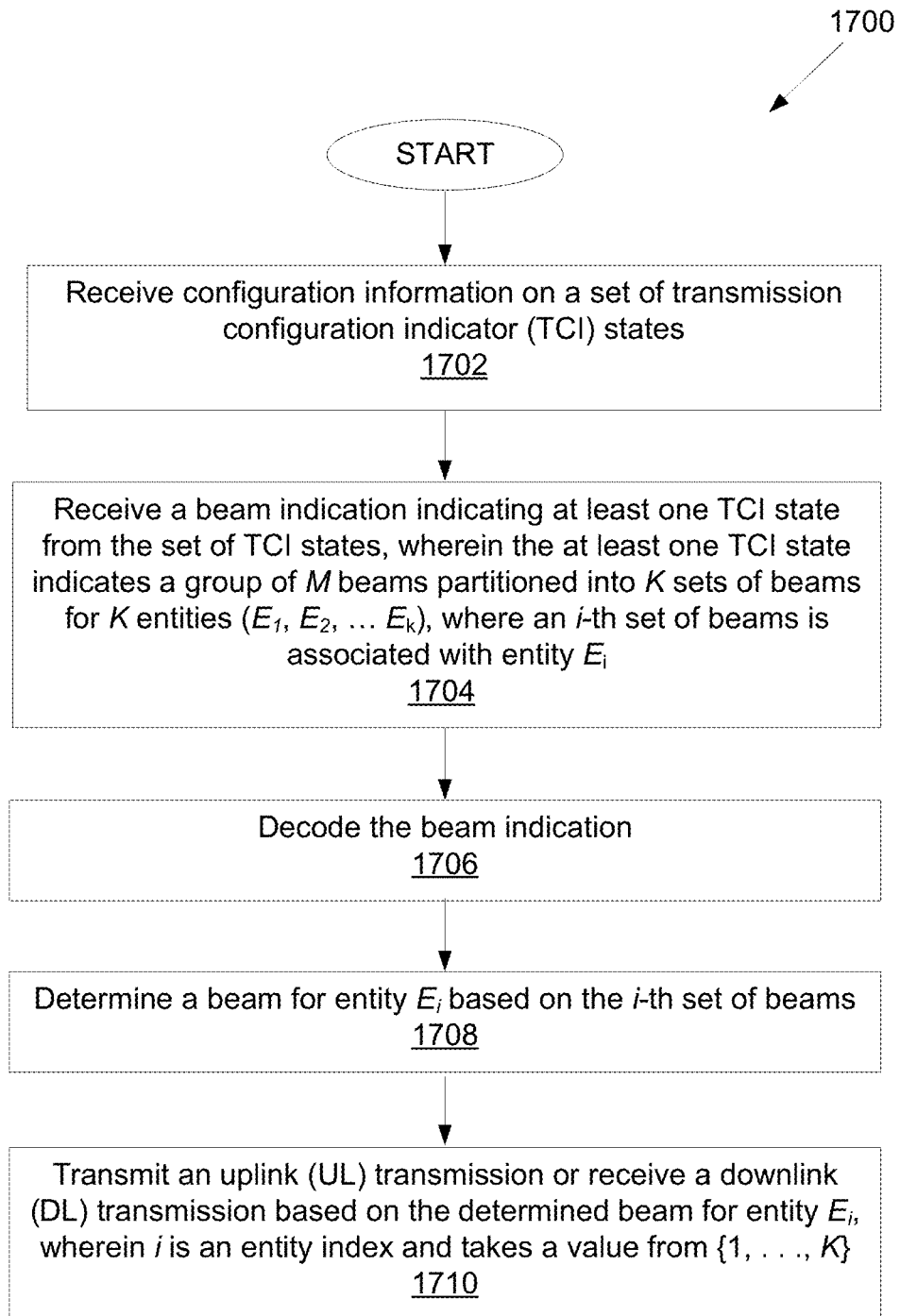
FIG. 17 illustrates a flow chart of a method for operating a user equipment (UE) according to embodiments of the present disclosure.

FIG. 17 illustrates a flow chart of a method 1700 for operating a user equipment (UE), as may be performed by a UE such as UE 116, according to embodiments of the present disclosure. The embodiment of the method 1700 illustrated in FIG. 17 is for illustration only. FIG. 17 does not limit the scope of this disclosure to any particular implementation.

As illustrated in FIG. 17, the method 1700 begins at step 1702. In step 1702, the UE (e.g., 111-116 as illustrated in FIG. 1) receives configuration information on a set of transmission configuration indicator (TCI) states.

In step 1704, the UE receives a beam indication indicating at least one TCI state from the set of TCI states, wherein the at least one TCI state indicates a group of M beams partitioned into K sets of beams for K entities ($E_1, E_2, \ldots E_K$), where an i-th set of beams is associated with entity $E_i$.

In step 1706, the UE decodes the beam indication.

In step 1708, the UE determines a beam for entity $E_i$ based on the i-th set of beams.

In step 1710, the UE transmits an uplink (UL) transmission or receives a downlink (DL) transmission based on the determined beam for entity $E_i$, wherein i is an entity index and takes a value from $\{1, \ldots, K\}$.

In one embodiment, the beam indication indicating the at least one TCI state is via downlink control information (DCI).

In one embodiment, a beam refers to a resource reference signal (RS) with a corresponding quasi co-location (QCL) type, wherein the QCL type is a type of a QCL property associated with the resource RS.

In one embodiment, the i-th set of beams comprises $N_i$ beams, and $\sum_{i=1}^{K} N_i = M$; $N_i \geq 1$; and $K \geq 1$.

In one embodiment, the K entities ($E_1, E_2, \ldots E_K$) comprise component carriers (CCs) from multiple CCs the UE is configured with.

In one embodiment, when K≥2, the entity $E_1$ comprises at least one of a DL channel, a physical downlink control channel (PDCCH) or a physical downlink shared channel (PDSCH), and the entity $E_2$ comprises at least one of an UL channel, a physical uplink control channel (PUCCH), a physical uplink shared channel (PUSCH), or a physical random access channel (PRACH).

In one embodiment, the K entities ($E_1$, $E_2$, . . . $E_K$) comprise transmit-receive points (TRPs) from multiple TRPs the UE communicates with.

In one embodiment, the K entities ($E_1$, $E_2$, . . . $E_K$) comprise antenna panels from multiple antenna panels at the UE.

Figure 18:
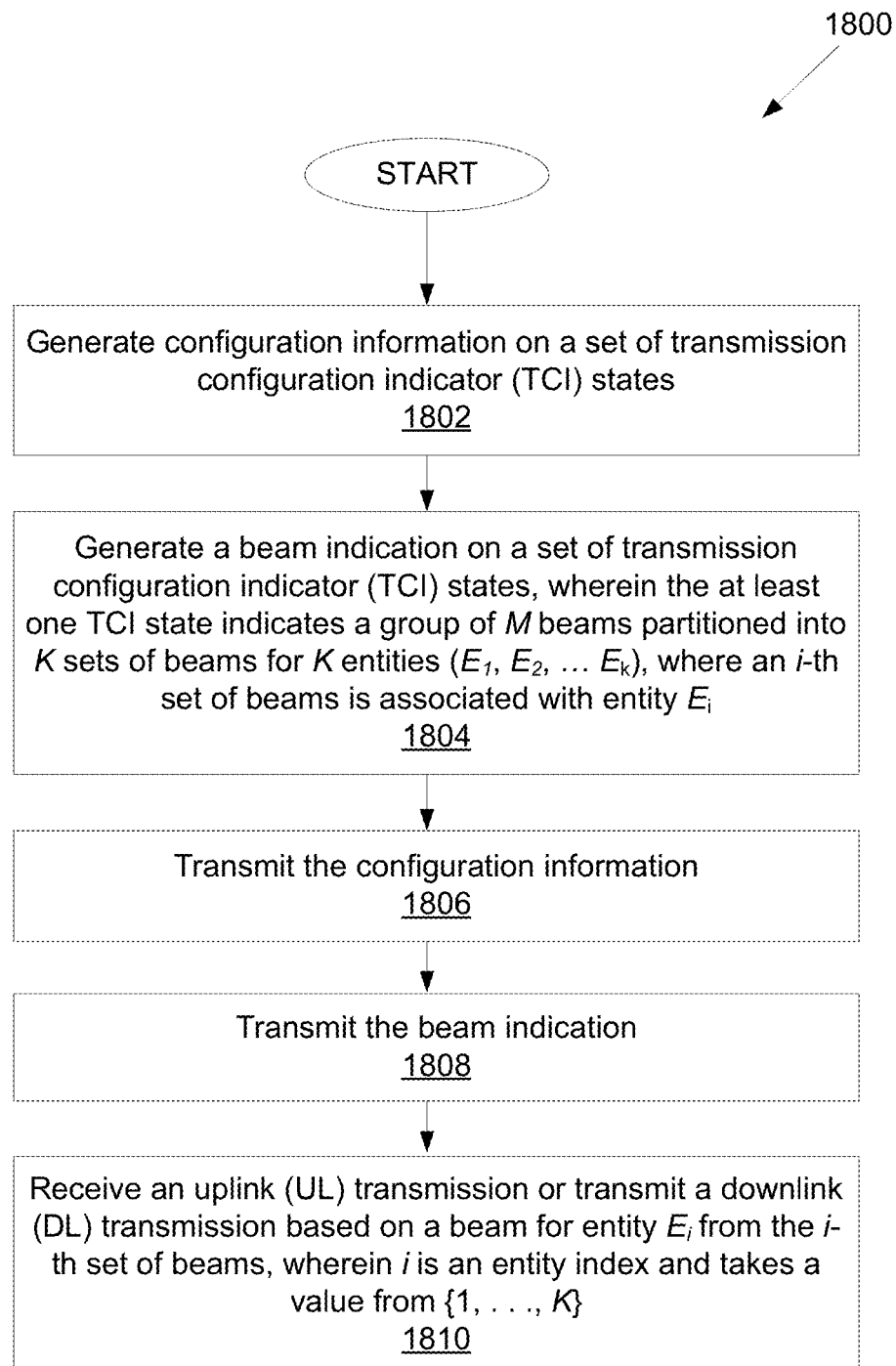
FIG. 18 illustrates a flow chart of another method as may be performed by a BS, according to embodiments of the present disclosure.

FIG. 18 illustrates a flow chart of another method 1800, as may be performed by a base station (BS) such as BS 102, according to embodiments of the present disclosure. The embodiment of the method 1800 illustrated in FIG. 18 is for illustration only. FIG. 18 does not limit the scope of this disclosure to any particular implementation.

As illustrated in FIG. 18, the method 1800 begins at step 1802. In step 1802, the BS (e.g., 101-103 as illustrated in FIG. 1) generates configuration information on a set of transmission configuration indicator (TCI) states.

In step 1804, the BS generates a beam indication indicating at least one TCI state from the set of TCI states, wherein the at least one TCI state indicates a group of M beams partitioned into K sets of beams for K entities ($E_1$, $E_2$, . . . $E_K$), where an i-th set of beams is associated with entity $E_i$ and comprises $N_i$ beams, and $\Sigma_{i=1}^{K} N_i = M$.

In step 1806, the BS transmits the configuration information.

In step 1808, the BS transmits the beam indication.

In step 1810, the BS receives an uplink (UL) transmission or transmits a downlink (DL) transmission based on a beam for entity $E_i$ from the i-th set of beams, wherein i is an entity index and takes a value from {1, . . . , K}.

In one embodiment, the beam indication indicating the at least one TCI state is via downlink control information (DCI).

In one embodiment, a beam refers to a resource reference signal (RS) with a corresponding quasi co-location (QCL) type, wherein the QCL type is a type of a QCL property associated with the resource RS.

In one embodiment, the i-th set of beams comprises $N_i$ beams, and $\Sigma_{i=1}^{K} N_i = M$; $N_i \geq 1$; and K≥1.

In one embodiment, the K entities ($E_1$, $E_2$, . . . $E_K$) comprise component carriers (CCs) from multiple CCs a user equipment (UE) is configured with.

In one embodiment, when K≥2, the entity $E_1$ comprises at least one of a DL channel, a physical downlink control channel (PDCCH) or a physical downlink shared channel (PDSCH), and the entity $E_2$ comprises at least one of an UL channel, a physical uplink control channel (PUCCH), a physical uplink shared channel (PUSCH), or a physical random access channel (PRACH).

In one embodiment, the K entities ($E_1$, $E_2$, . . . $E_K$) comprise transmit-receive points (TRPs) from multiple TRPs a user equipment (UE) is configured with.

In one embodiment, the K entities ($E_1$, $E_2$, . . . $E_K$) comprise antenna panels from multiple antenna panels at a user equipment (UE).

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to:
receive configuration information on a first list of transmission configuration indicator (TCI) states; and
receive an indication indicating a TCI state among the first list of TCI states, wherein the configuration information instructs the UE to use the TCI state for both downlink (DL) and uplink (UL); and
a processor coupled with the transceiver, the processor configured, based on the indication, to determine:
a UL transmission spatial filter for a physical uplink shared channel (PUSCH) and a physical uplink control channel (PUCCH), and
a reference signal for a quasi co-location for a demodulation-reference signal (DM-RS) of a physical downlink shared channel (PDSCH) and a DM-RS of a physical downlink control channel (PDCCH),
wherein the transceiver is further configured to transmit a UL signal or receive a DL signal based on the UL transmission spatial filter or the reference signal, respectively,
wherein the first list of TCI states includes at least one joint TCI state for DL and UL, and
wherein the TCI state indicated via the indication is common for a plurality of component carriers (CCs) configured for the UE.

2. The UE of claim 1, wherein the transceiver is further configured to:
receive a medium access control (MAC) control element (CE) for at least one activated TCI state among the first list of TCI states; and
receive downlink control information (DCI) including the indication indicating the TCI state among the at least one activated TCI state.

3. The UE of claim 1, wherein:
the transceiver is further configured to receive configuration information on a second list of TCI states, and
the indication indicates a TCI state only for UL among the second list of TCI states.

4. A base station (BS) comprising:
a processor configured to:
generate configuration information on a first list of transmission configuration indicator (TCI) states; and
generate an indication indicating a TCI state among the first list of TCI states, wherein the configuration information instructs a user equipment (UE) to use the TCI state for both downlink (DL) and uplink (UL); and
a transceiver coupled to the processor, the transceiver configured to:
transmit the configuration information;
transmit the indication indicating the TCI state; and
receive a UL signal or transmit a DL signal according to the indication,
wherein the indication is associated with a UL transmission spatial filter of the UE for a physical uplink shared channel (PUSCH) and a physical uplink control channel (PUCCH) carrying the UL signal, and associated with a reference signal for a quasi co-location for a demodulation-reference signal (DM- RS) of a physical downlink shared channel (PDSCH) and a DM-RS of a physical downlink control channel (PDCCH) carrying the DL signal, and wherein the first list of TCI states includes at least one joint TCI state for DL and UL.

5. The BS of claim 4, wherein the indicated TCI state is common for a plurality of component carriers (CCs) configured for the UE.

6. The BS of claim 4, wherein the transceiver is further configured to:

transmit a medium access control (MAC) control element (CE) for at least one activated TCI state among the first list of TCI states; and transmit downlink control information (DCI) including the indication indicating the TCI state among the at least one activated TCI state.

7. The BS of claim 4, wherein:

the transceiver is further configured to transmit configuration information on a second list of TCI states, and the indication indicates a TCI state only for UL among the second list of TCI states.

8. A method performed by a user equipment (UE), the method comprising:

receiving configuration information on a first list of transmission configuration indicator (TCI) states;

receiving an indication indicating a TCI state among the first list of TCI states, wherein the configuration information instructs the UE to use the TCI state for both downlink (DL) and uplink (UL);

based on the indication, determining:

a UL transmission spatial filter for a physical uplink shared channel (PUSCH) and a physical uplink control channel (PUCCH), and a reference signal for a quasi co-location for a demodulation-reference signal (DM-RS) of a physical downlink shared channel (PDSCH) and a DM-RS of a physical downlink control channel (PDCCH); and transmitting a UL signal or receiving a DL signal based on the UL transmission spatial filter or the reference signal, wherein the first list of TCI states includes at least one joint TCI state for DL and UL.

9. The method of claim 8, wherein the indicated TCI state is common for a plurality of component carriers (CCs) configured for the UE.

10. The method of claim 8, wherein receiving the indication further comprises:

receiving a medium access control (MAC) control element (CE) for at least one activated TCI state among the first list of TCI states; and receiving downlink control information (DCI) including the indication indicating the TCI state among the at least one activated TCI state.

11. The method of claim 8, further comprising receiving configuration information on a second list of TCI states, wherein the indication indicates a TCI state only for UL among the second list of TCI states.

* * * * *